United States Patent [19]

Kameyama

[11] Patent Number: 5,659,826
[45] Date of Patent: Aug. 19, 1997

[54] LENS-FITTED PHOTOGRAPHIC FILM UNIT WITH PICTURE FRAME SIZE CHANGING DEVICE

[75] Inventor: Nobuyuki Kameyama, Kanagawa, Japan

[73] Assignee: Fuji Photo Film Co., Ltd., Kanagawa, Japan

[21] Appl. No.: 542,022

[22] Filed: Oct. 12, 1995

Related U.S. Application Data

[63] Continuation of Ser. No. 216,953, Mar. 24, 1994, abandoned.

[30] Foreign Application Priority Data

Mar. 24, 1993 [JP] Japan ................................. 5-065522
Nov. 1, 1993 [JP] Japan ................................. 5-273819

[51] Int. Cl.$^6$ ............................. G03B 13/10; G03B 17/02
[52] U.S. Cl. ........................................... 396/378; 396/435
[58] Field of Search ............................... 354/288, 159, 354/94, 219, 222; 396/435, 436, 378, 380

[56] References Cited

U.S. PATENT DOCUMENTS

| | | | |
|---|---|---|---|
| 4,032,940 | 6/1977 | Chan | 354/219 |
| 4,231,649 | 11/1980 | Kimura et al. | 354/224 |
| 4,884,087 | 11/1989 | Mochida et al. | 354/288 |
| 4,961,085 | 10/1990 | Cho et al. | 354/295 |
| 4,973,997 | 11/1990 | Harvet | 354/105 |
| 5,066,971 | 11/1991 | Kodaira | 354/465 |
| 5,084,721 | 1/1992 | Burnhara | 384/187 |
| 5,086,311 | 2/1992 | Naka et al. | 354/288 |
| 5,181,057 | 1/1993 | Tailagi et al. | 354/94 |
| 5,227,824 | 7/1993 | Yoshida et al. | 354/195.12 |
| 5,255,030 | 10/1993 | Moeai et al. | 354/94 |
| 5,257,055 | 10/1993 | Cho et al. | 354/288 |
| 5,329,330 | 7/1994 | Sakai et al. | 354/288 |

FOREIGN PATENT DOCUMENTS 3-122435 12/1991 Japan.

Primary Examiner—Safet Metjahic
Assistant Examiner—Nicholas J. Tuccillo
Attorney, Agent, or Firm—Young & Thompson

[57] ABSTRACT

A picture frame size changing device for a lens-fitted photographic film unit has a pair of exposure aperture masking plates which are pivotally mounted in a light-shielding box disposed in front of an exposure aperture. The masking plates define a picture frame size which has a different aspect ratio from that of the exposure aperture. A finder mask is mounted on a front cover of the film unit, which is manually operable to be inserted in front of an objective window of a viewfinder. A lever mechanism for interconnecting the finder mask with one of the mask plates is mounted on the outside of the light-shielding box. The light-shielding box is incorporated into a photograph-taking unit having an exposure mechanism and a viewfinder optical system mounted thereon.

13 Claims, 23 Drawing Sheets

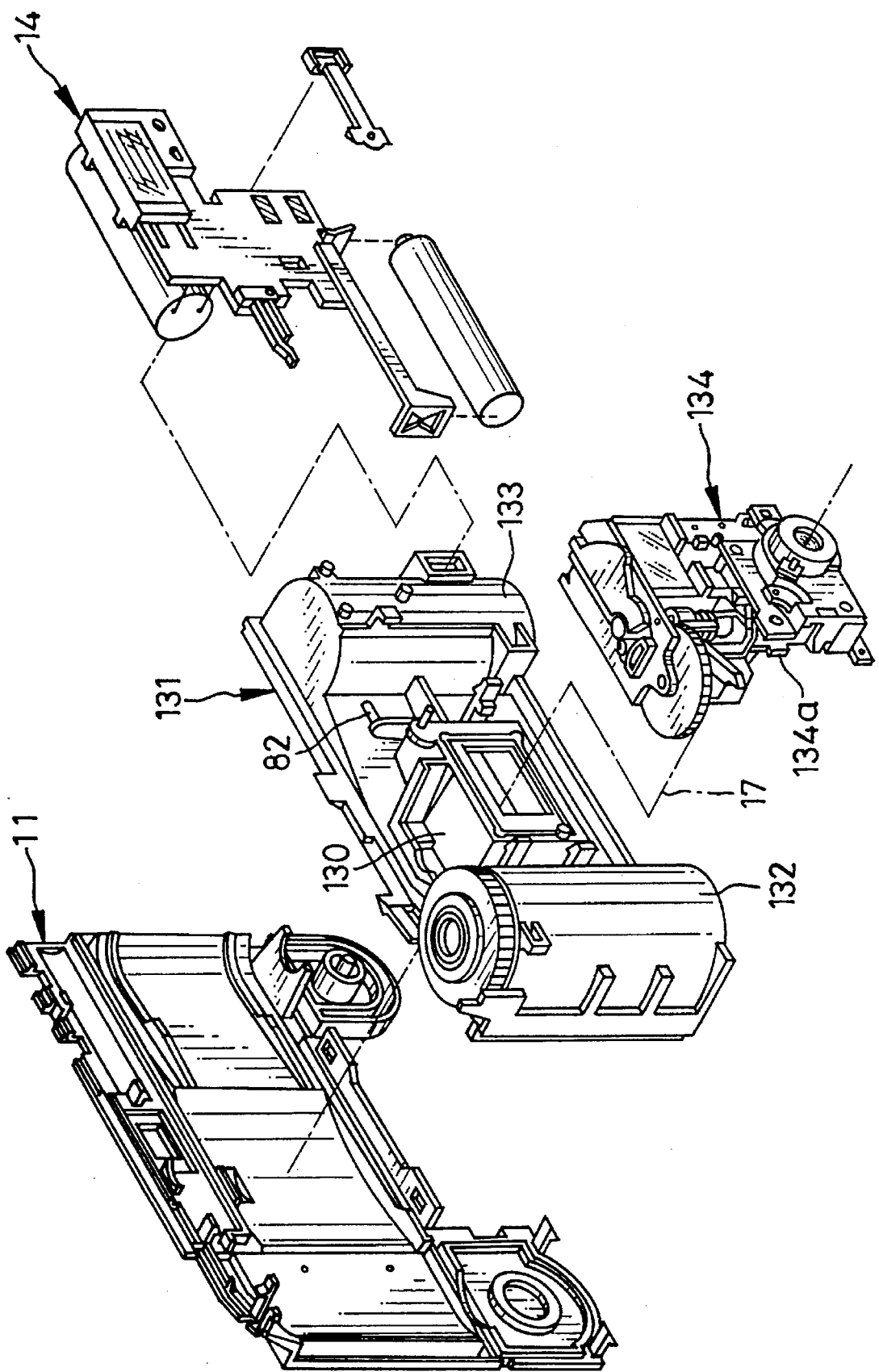

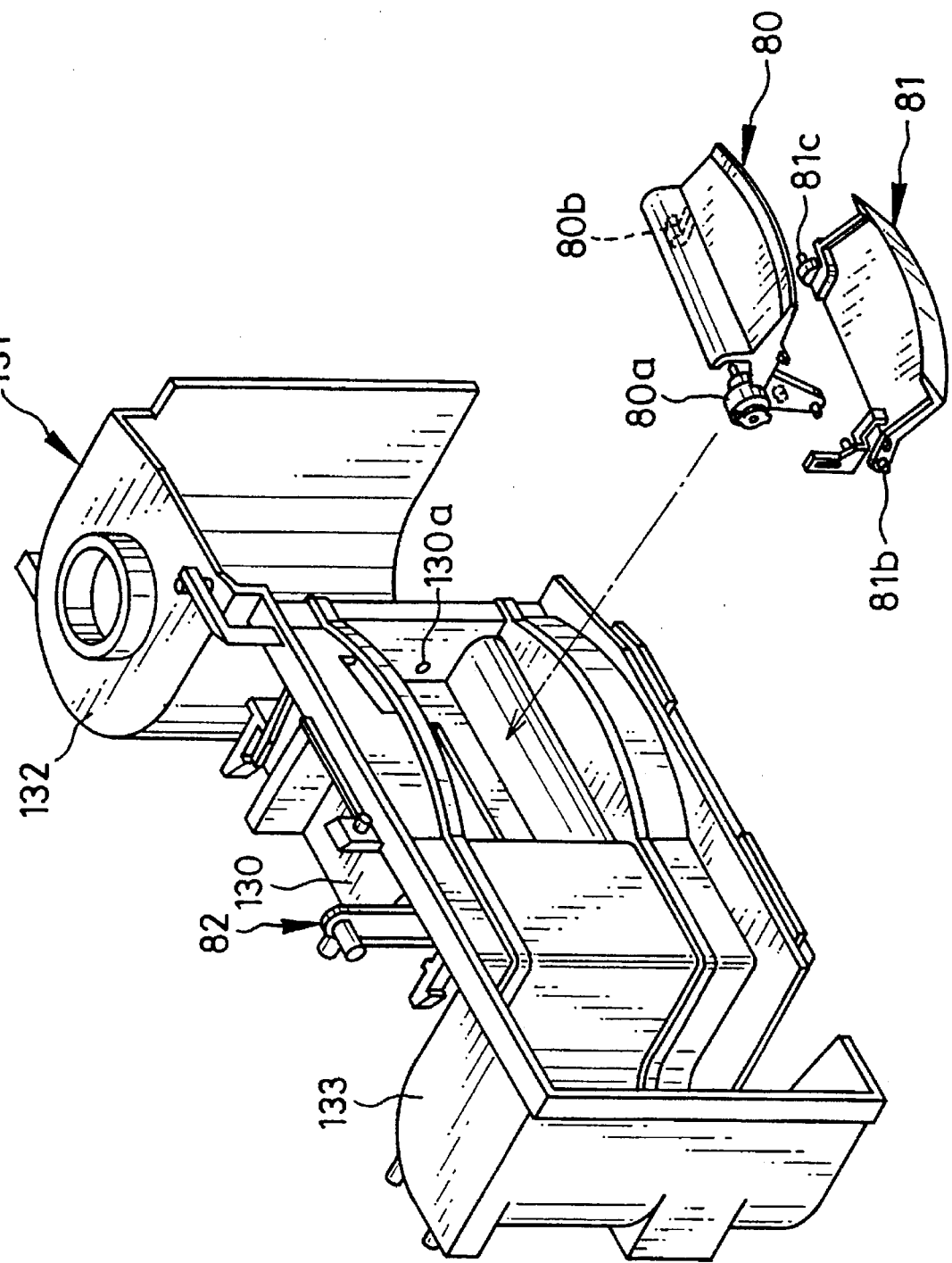

LENS-FITTED PHOTOGRAPHIC FILM UNIT WITH PICTURE FRAME SIZE CHANGING DEVICE

This application is a continuation of application Ser. No. 08/216,953, filed Mar. 24, 1994, now abandoned.

BACKGROUND OF THE INVENTION

1. Field of the Invention

The present invention relates to a device for changing the size of picture frames to be formed on photographic film by changing exposure aperture size, and also relates to a lens-fitted photographic film unit having such a device.

2. Related Art

Compact cameras having a picture frame size changing device are known, wherein either full size photography or panoramic photography may be practiced, and the field of view of the viewfinder is also changed to correspond to either the full size or the panoramic size photographic field.

In one of the known compact cameras having such a picture frame size changing device and an Albada-type inverted Galilean viewfinder, a reticule lens for displaying a panoramic field of view is provided in addition to a reticule lens for displaying a standard field of view having an aspect ratio for full size, and the panoramic reticule lens is removably insertable into the optical system of the viewfinder.

The conventional picture frame size changing devices mostly change the size of the exposure aperture between a full size of, for example, 24 mm ×36 mm (aspect ratio 1.5) and a panoramic size of, for example, 13 mm ×36 mm (aspect ratio 2.8) by using upper and lower masking plates.

On the other hand, lens-fitted photographic film units (hereinafter referred to as film units) are widely used, each of which has a simple exposure mechanism and contains a film cassette so that anyone may enjoy photographing with ease at low cost.

Because the film unit cannot be repeatedly loaded with film, after the exposure of all available frames of the contained film, the whole film unit is forwarded to a photofinisher. After the exposed film is removed to be processed for photo-printing, the empty housing of the film unit is returned to the manufacturer. The manufacturer disassembles and sorts out reusable parts of the film unit for recycling. It is desirable to reuse as many parts as possible without reprocessing, and to reassembled them into new film units. Also an exposure aperture size changing mechanism should be suitable for reuse, that is, it should be easy to assemble and disassembled, and should be suitable for automatic disassembly, inspection and reassembly.

These film units are also required to be as compact as possible. Therefore, the exposure aperture size change mechanism for a film unit should not much increase the size of the film unit.

In addition to this problem, the exposure aperture size change mechanism for a film unit should be inexpensive and easy to assemble, in keeping with the inexpensive nature of the film units.

OBJECTS OF THE INVENTION

In view of the foregoing, an object of the present invention is to provide a picture frame size changing device, which can be incorporated into a film unit or a compact camera having an inverted Galilean viewfinder at a low cost in a compact fashion, and which makes it possible to easily and reliably change over the size of the exposure aperture in correspondence with the size of the field of view of the viewfinder.

Another object of the present invention is to provide a film unit having a picture frame size changing device which can be easily and reliably assembled and disassembled.

SUMMARY OF THE INVENTION

To achieve the above and other objects, the present invention provides a finder mask member movable into a position in front of the objective window of the inverted Galilean viewfinder to provide a field of view which corresponds to the size of the picture frame which is defined by a pair of exposure aperture size masking plates which are movable into a position in front of an exposure aperture, and an interconnecting mechanism between the finder mask member and the exposure aperture size masking plate. An operating member for selectively setting the exposure aperture masking plate in one of two different picture frame size positions is integrally formed with the finder mask member.

The exposure aperture masking plates are movably mounted in a light-shield box, and a mechanism base is provided for mounting an exposure mechanism. The viewfinder and the interconnecting mechanism are integrally formed with the light-shielding box to form a unit which is attached to the front of the exposure aperture. The interconnecting mechanism is disposed along the outside of the light-shielding box in a space between the light-shielding box and a film supply chamber. A printed circuit board of a flash unit may be disposed in front of the interconnecting mechanism.

BRIEF DESCRIPTION OF THE DRAWINGS

Other objects, features and advantages of the present invention will become apparent from the following detailed description of the preferred embodiments when read in connection with the accompanying drawings, wherein like reference numerals designate like or corresponding parts throughout the several views, and wherein:

FIG. 20 is an exploded front perspective view of a film unit having a light-shielding box integrally formed with the main body section according to another embodiment of the present invention; wherein the front cover is omitted for clarity; and FIG. 21 is an exploded rear perspective view of the main body section shown in FIG. 20, having exposure aperture masking plates mounted in the light-shielding box.

DETAILED DESCRIPTION OF THE PREFERRED EMBODIMENTS

Figure 1:
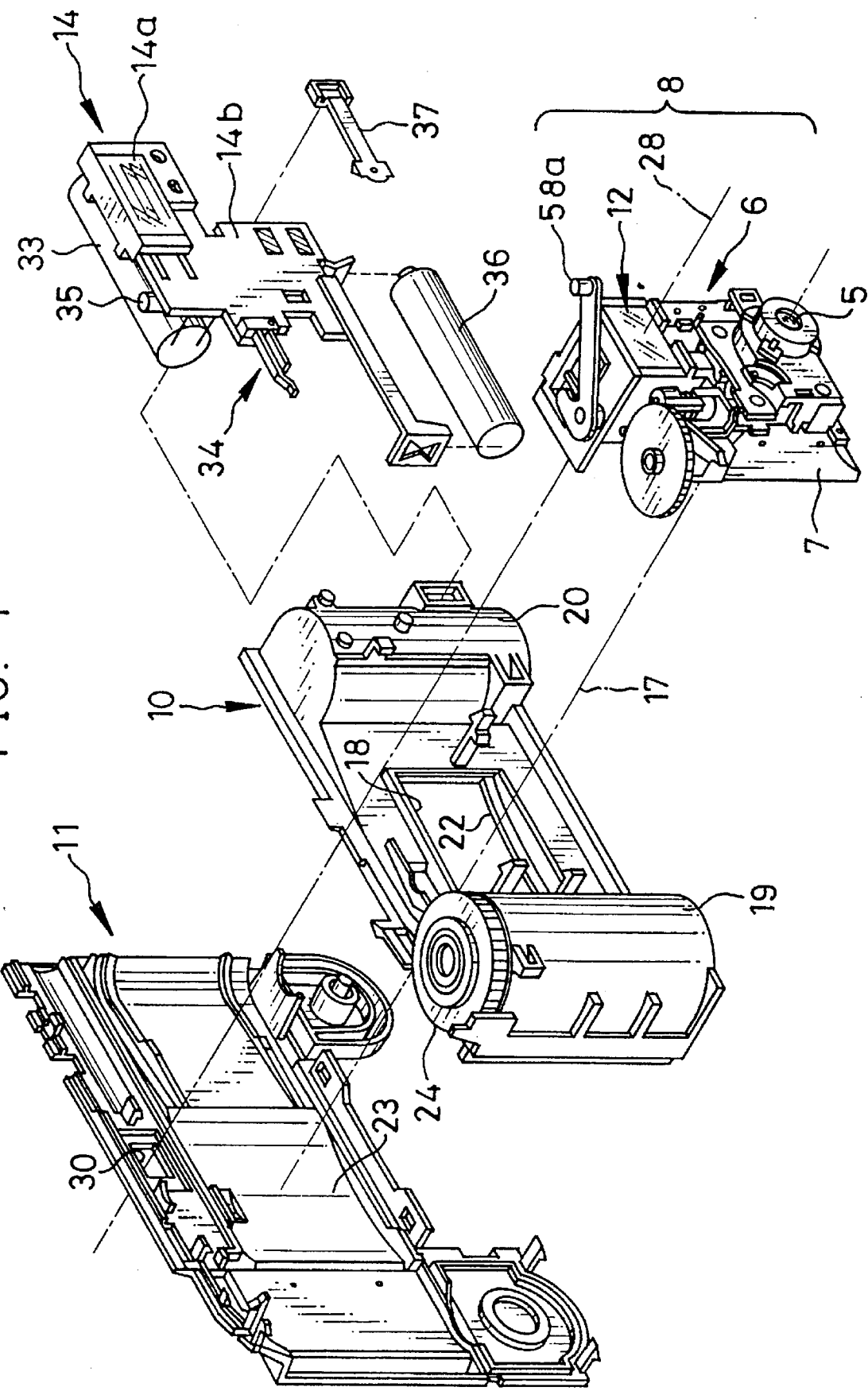
FIGS. 1 and 2 together comprise an exploded perspective view of a film unit according to an embodiment of the invention.
Figure 2:
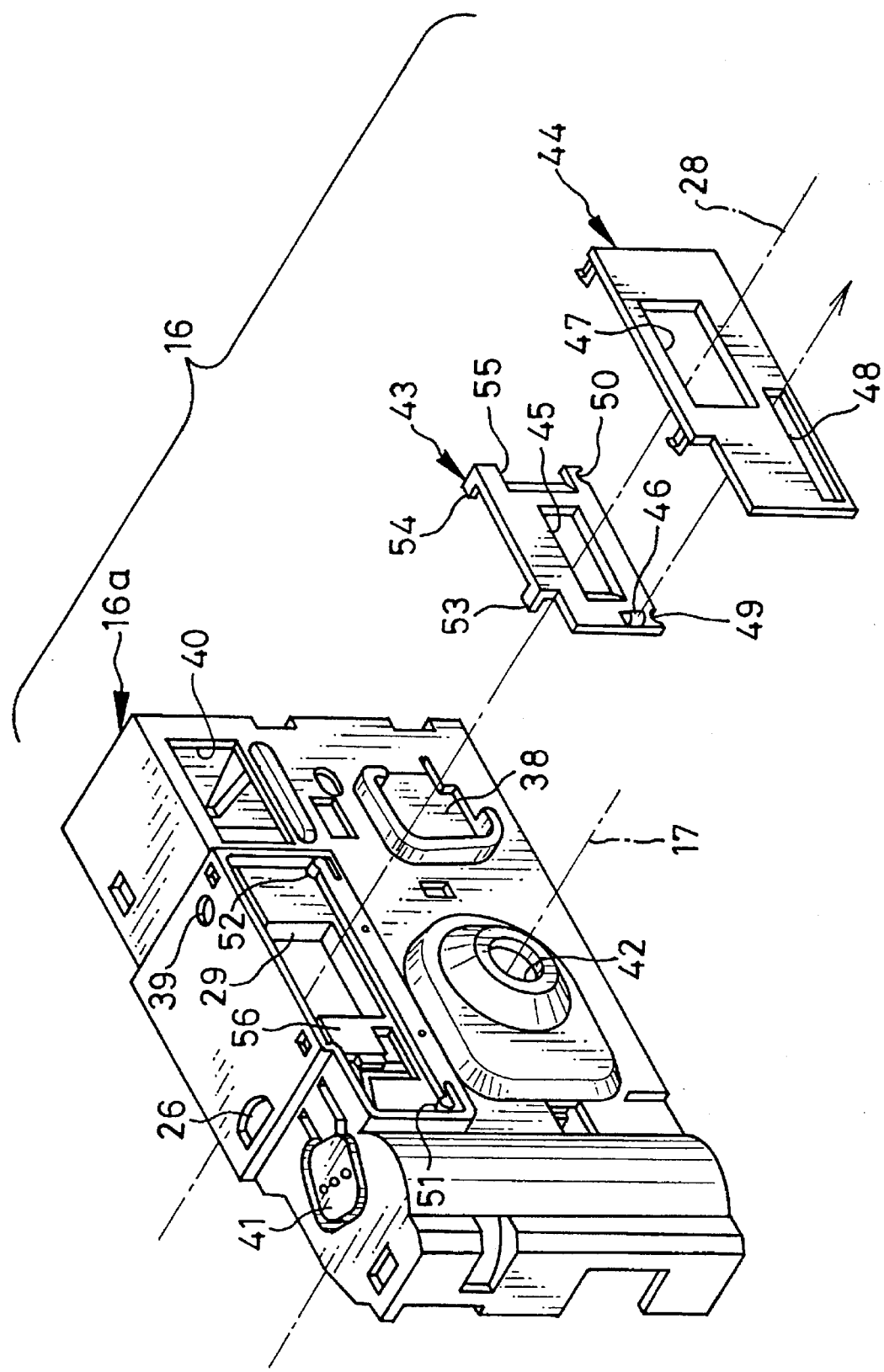
Figure 3:
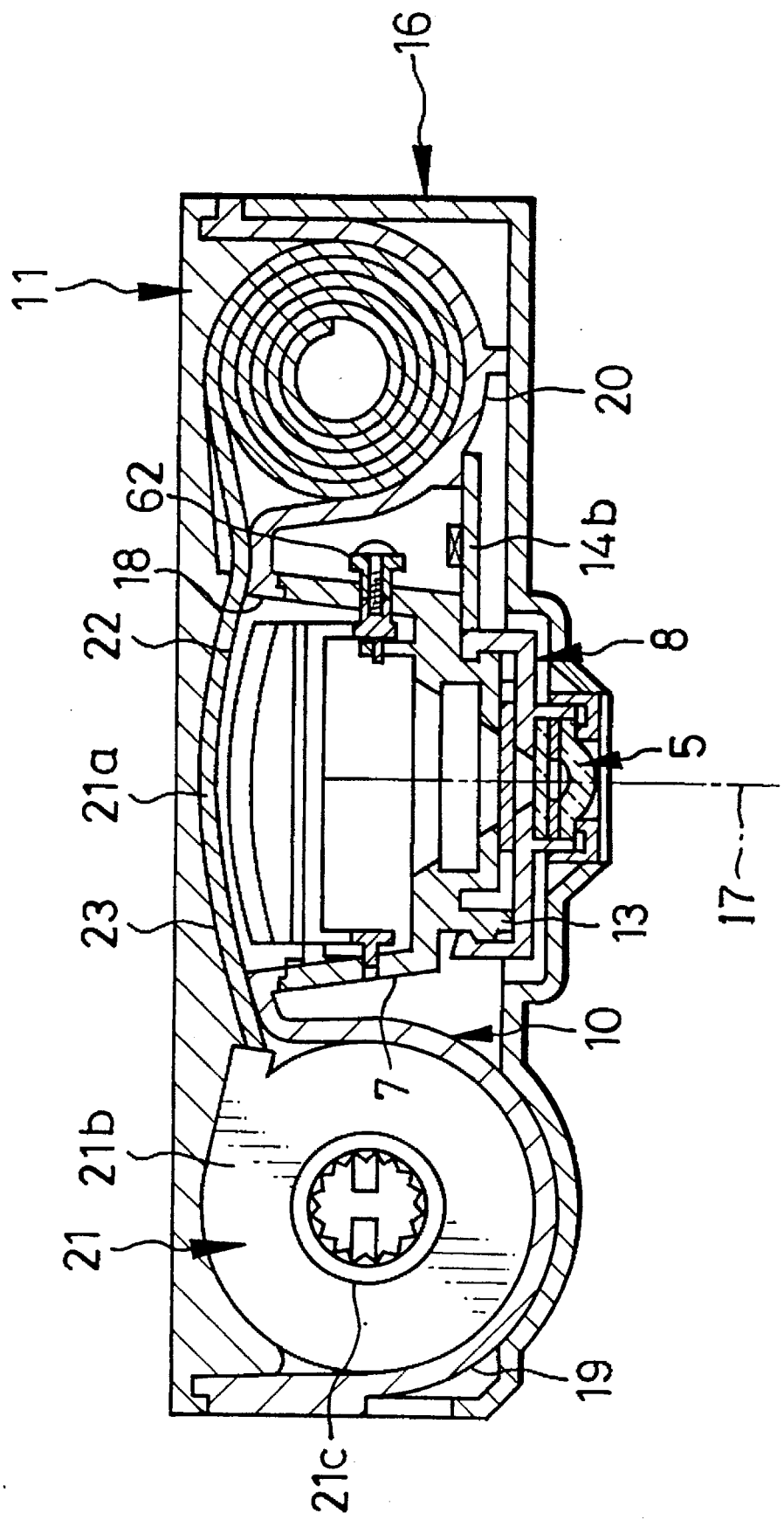
FIG. 3 is a horizontal sectional view of the film unit shown in FIGS. 1 and 2.

In the film unit shown in FIGS. 1 to 3, a taking lens 5 and exposure mechanisms 6 such as a shutter mechanism are incorporated in a photograph-taking unit 8 which has an exposure chamber or a light-shielding box 7 formed integrally therewith. The photograph-taking unit 8 is removably attached to the front of a main body section 10 of the film unit. The rear side of the main body section 10 is light-tightly closed by a rear cover 11 which is removably attached to the main body section 10. An L-shaped mechanism base portion 13 is integrally formed with the photograph-taking unit 8 in the front and top sides of the light-shielding box 7. On the mechanism base portion 13, the exposure mechanisms 6, a viewfinder optical system 12 and an exposure aperture size changing mechanism are mounted as shown in detail in FIGS. 4 and 5. A flash unit 14 is also removably attached to the front of the main body 10 beside the photograph-taking unit 8. A front cover 16 is removably attached to the main body section 10 to cover these units 8 and 14.

An exposure aperture 18 is formed integrally with the main body section 10, so as to be coaxial with the taking lens 5 when the photograph-taking unit 8 is removably attached to the front of the exposure aperture 18 by claw-hole engagement or the like. A cassette chamber 19 and a film roll chamber 20 are disposed on opposite sides of the exposure aperture 18, although the exposure aperture 18 is disposed closer to the film cassette chamber 19. An ISO 135-type film cassette 21 (ISO: 1007-1979) is loaded in the film unit, such that a roll of photographic film 21a which has been pulled out from a cassette housing 21b and wound in a roll is held in the film roll chamber 20, while the empty cassette housing 21b having a spool 21c secured to an end of the photographic film 21a is held in the cassette chamber 19. The photographic film 21a is shielded from ambient light by the rear cover 11.

The exposure aperture 18 has a size corresponding to a full size picture frame of ISO 135-type film (aspect ratio 1.5). A film supporting surface 22 formed on the rear side of the main body section 10 surrounding the exposure aperture has a curvature so as to curve the photographic film 21a forwardly concave relative to the film advancing direction. A film confining surface 23 of the rear cover 11 is also curved complementarily to the curvature of the film supporting surface 22 in a portion behind the exposure aperture 18.

A film advancing wheel 24 mounted on the top of the cassette chamber 19 engages with the spool 21c of the film cassette 21, thereby to rewind the photographic film 21a into the cassette housing 21b one frame after each exposure. A frame counter disk 25 is mounted on the photograph-taking unit 8, whose markings can be seen through a frame number window 26 formed in the top wall portion of the front cover 16.

An inverted Galilean viewfinder 12 consisting of an objective lens 12a and an eyepiece 12b is removably mounted on an upper portion of the mechanism base portion 13, and is held by a finder lens holding plate 27 on the mechanism base portion 13. An objective window 29 and an eyepiece window 30 are respectively formed in the front cover 16 and the rear cover 11, coaxially with the optical axis 28 of the viewfinder 12. The objective window 29 limits the field of view of the viewfinder 12 in correspondence with the photographic field for the full size picture frame.

The flash unit 14 has a light emitting portion 14a, a printed circuit board 14b, a capacitor 33, a pair of contacts 34, and a charge end lamp 35. The capacitor 33 begins to be charged by a battery 36 upon depression of a metal contact plate 37 through a resilient charge switch portion 38 which is formed integrally with the front cover 16. The metal contact plate 37 is mounted con the outer surface of the film roll chamber 20 of the main body 10. When the capacitor 33 is fully charged, the charge end lamp 35 lights intermittently, and this can be seen through a window 39 formed in the top of the front cover 16. The light emitting portion 14a having a flash tube and a reflector behind a diffusion plate projects light through a flash window 40 formed in the front cover 16 in response to a trigger signal applied through the contacts 34. The printed circuit board 14b is mounted on the front of the main body section 10 between the film roll chamber 20 and the light shielding box 7, such that electric elements mounted on the back of the printed circuit board 14b are accommodated in a space between the film roll chamber 20 and the light shielding box 7. The battery 36 is disposed horizontally below the light shielding box 7. This arrangement contributes to compactness of the film unit.

The front cover 16 is constituted of a front cover basic body 16a having the finder objective window 29, the flash window 40, a shutter button 41, a taking lens aperture 42 and other elements which are integrally formed therewith, and a panoramic finder mask 43 and a cover panel 44 attached to the cover body 16a. The finder mask 43 has a panoramic window 45 which limits the field of view to the same aspect ratio as a panoramic size frame. The finder mask 43 also has a knob 46 which is used for operating the finder mask 43 and changing the exposure aperture size, as will be set forth later. An opening 47 corresponding to the objective window 29 is formed through the cover panel 44, and has margins defining the full size field of view for standard photography in combination with the objective window 29. The cover panel 44 also has a slot 48 in which the knob 46 is engaged. Of course, the field of view for standard photography can be defined by the opening 47, while the objective window 29 is sized to correspond to that field.

The finder mask 43 is slidable on a recessed portion 56 formed around the objective window 29 of the front cover basic body 16a so as to be slidable in the film transporting direction between a panoramic position and a standard position. In the standard position, the panoramic window 45 is retracted from the field of the viewfinder 12 in a direction perpendicular to the optical axis 28 thereof. In the standard position, notches 49 and 50 formed in the bottom edge of the finder mask 43 at the left and right ends of FIG. 2 are fitted on clicks 51 and 52 formed at the bottom corners of the recessed portion 56, in the standard and the panoramic positions, respectively. The finder mask 43 also has a pair of projections 53 and 54 disposed side by side on the top edge thereof and projecting rearward, through which the movement of the finder mask 43 is transmitted to the exposure aperture size changing mechanism shown in FIG. 4. The right edge 55 of the finder mask 43 is cut off so as to minimize the stroke of the finder mask 43 without interfering with the field of view in the standard position.

Figure 4:
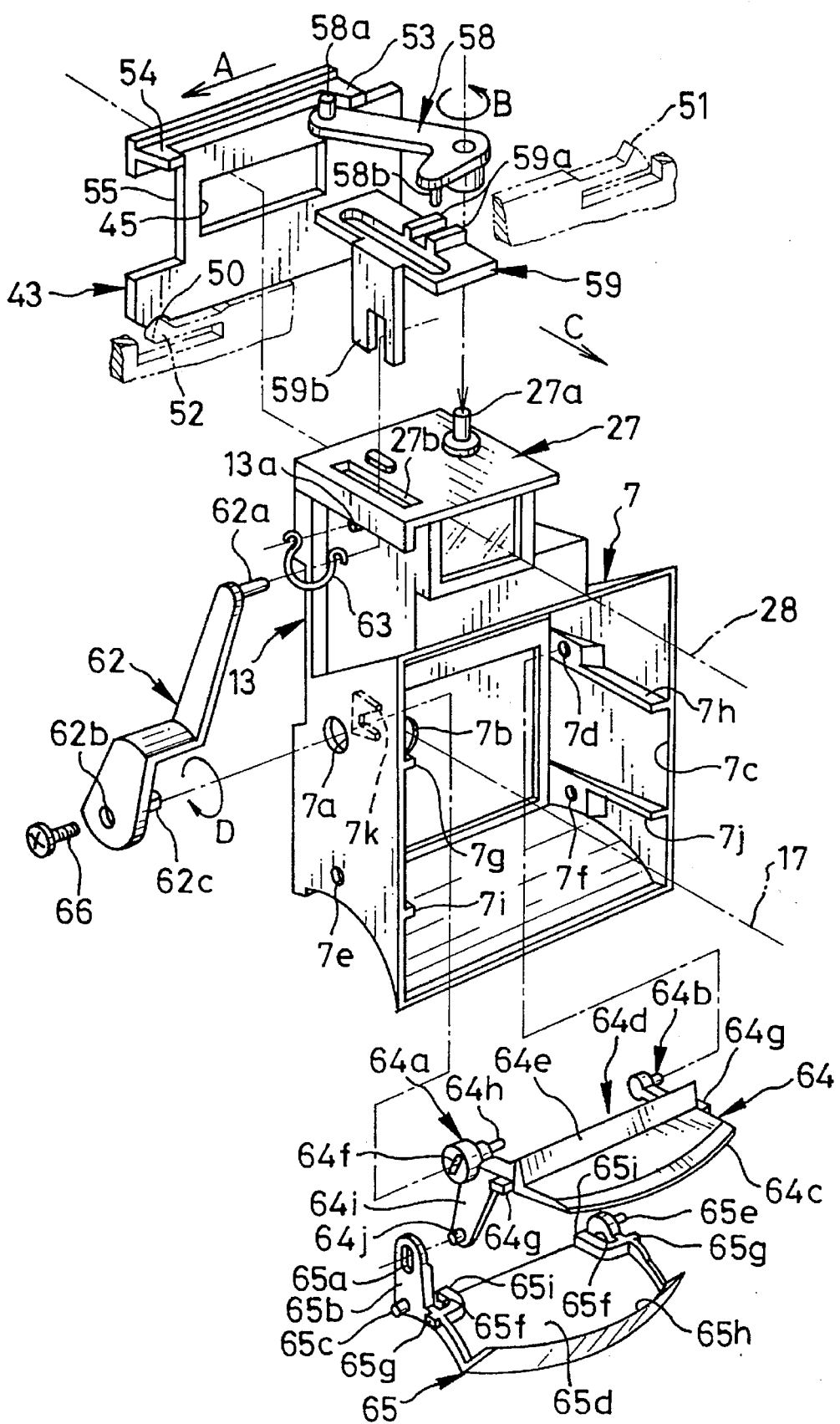
FIG. 4 is an exploded perspective view of an exposure aperture size changing mechanism of the film unit shown in FIGS. 1 and 2.
Figure 5A:
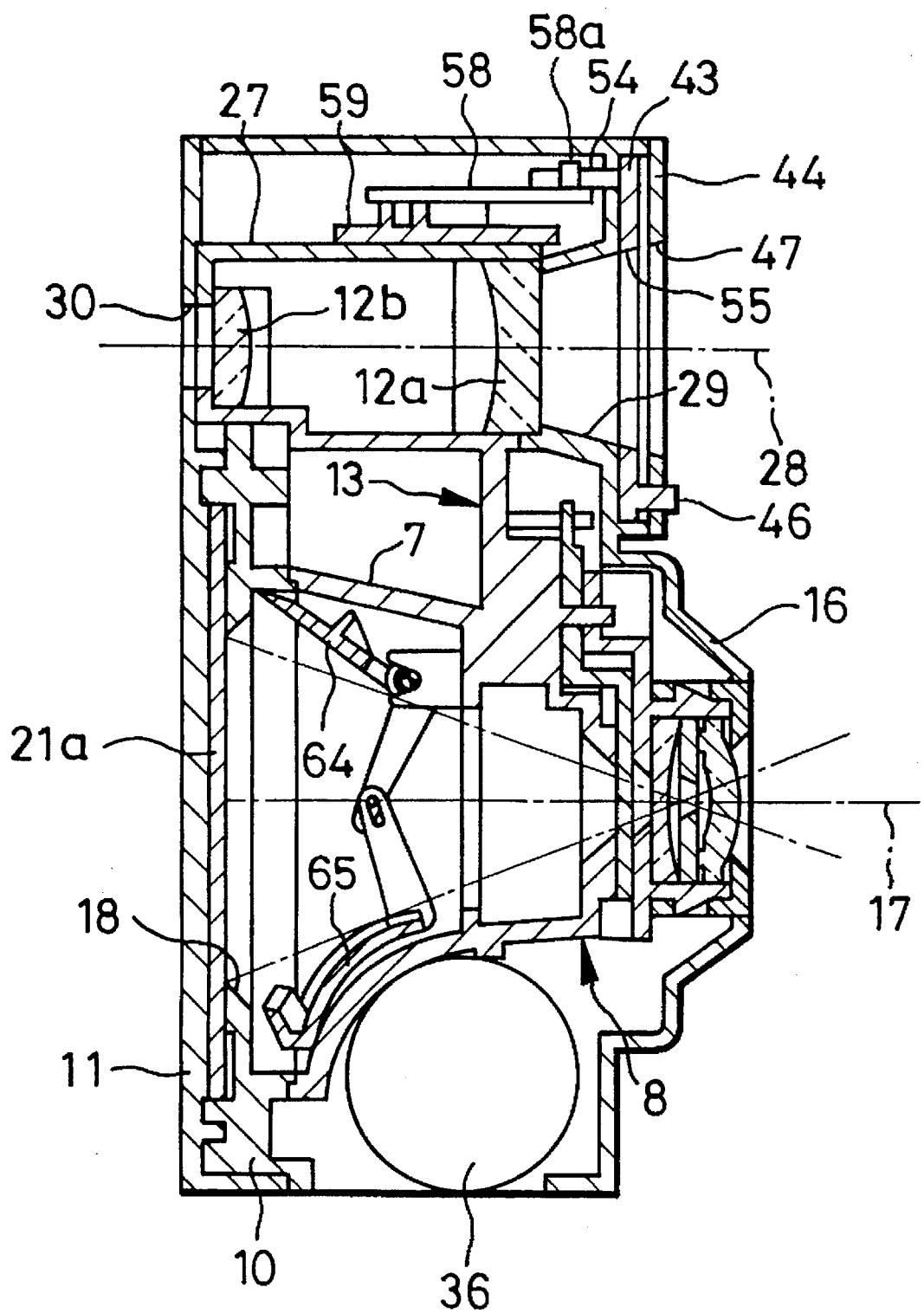
FIG. 5A is a vertical sectional view of the film unit shown in FIGS. 1 and 2 and illustrates the exposure aperture size changing mechanism in the standard position.
Figure 5B:
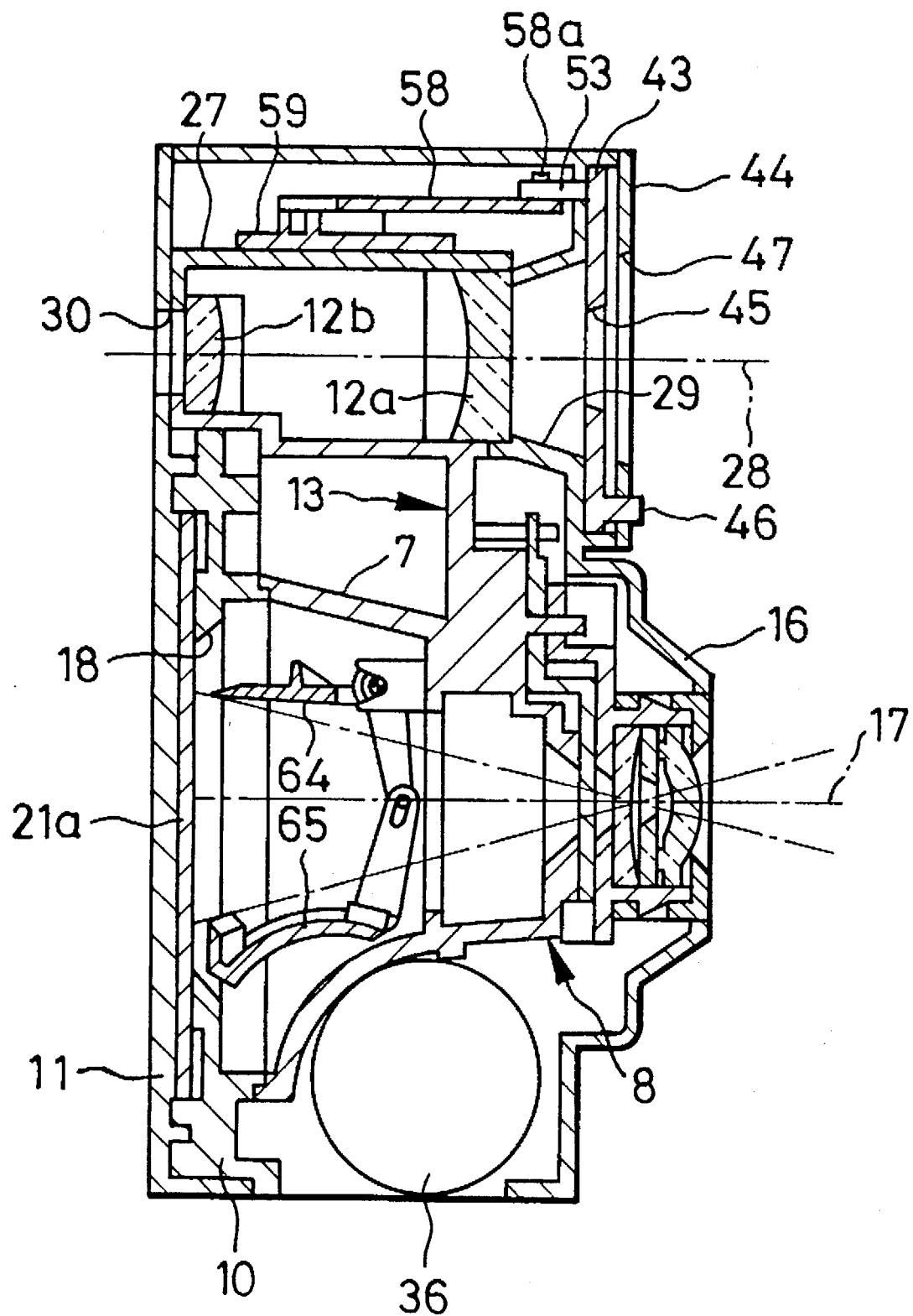
FIG. 5B is a view similar to that of FIG. 5A and illustrates the exposure aperture size changing mechanism in the panoramic position.

FIG. 4 shows the exposure aperture size changing mechanism, which is mainly comprised by a switching lever 58, a slide plate 59, a crank lever 62, a toggle spring 63, and upper and lower aperture masking plates 64 and 65. The upper and lower aperture masking plates 64 and 65 are each formed as one body from a resilient material. The switching lever 58 has a pin 58a on one end thereof, which is disposed in the path of the projections 53 and 54. Thereby, the pin 58a may be pushed by either of the projections 53 and 54 to cause the switching lever 58 to rotate about an axle 27a formed on the top wall of the finder lens holding plate 27, when the finder mask 43 moves.

The slide plate 59 has a pair of ridges 59a, in which a pin 58b formed on the other end of the switching lever 58 is fitted. The slide plate 59 slides on the finder lens holding plate 27 in the direction of the optical axes 17 and 28 in cooperation with the switching lever 58. The slide plate 59 is coupled to the crank lever 62 through engagement between a fork 59b of the slide plate 59 and a pin 62a formed on an upper end of the crank lever 62. The crank lever 62 also has a bearing portion 62b on its lower end. The crank lever 62 is disposed behind the printed circuit board 14b along the side wall of the light shielding box 7 so as not to interfere with the electric elements of the flash circuit. A toggle spring 63 is fitted on the pin 62a of the crank lever 62, while the other end of the toggle spring 63 is fitted on a stationary pin 13a formed on the mechanism base portion 13 of the photograph taking unit 8. The bearing portion 62b of the crank lever 62 is coupled to the upper aperture masking plate 64 by a screw 66 or the like inserted in a bearing hole 7a of the light-shielding box 7. A coupling peg 62c is formed integrally with the crank lever on the opposite side of the screw 66.

The bottom wall of the light-shielding box 7 is curved complementarily to the contour of the cylindrical battery 36 disposed therebelow, and has front and rear openings 7b and 7c for the passage of the exposure light. The rear opening 7c is aligned with the exposure aperture 18. A second bearing hole 7d for bearing the upper aperture masking plate 64 is formed on the side of the light-shielding box 7 opposite the bearing hole 7a so as to allow pivoting of the upper aperture masking plate 64 about an axis extending in the film transporting direction near the front opening 7b. Another pair of bearing holes 7e and 7f are formed correspondingly below the bearing holes 7a and 7d, for bearing the lower aperture masking plate 65. Two pairs of stops 7g and 7h; 7i and 7j are formed integrally on the inside of the side walls of the light-shielding box 7 so as to position the plates 64 and 65 in the panoramic position.

The upper aperture masking plate 64 has a pair of pivots 64a and 64b on opposite horizontal sides of its front end portion. A rear edge 64c of the upper aperture masking plate 64 has a curve which is complementary to the curvature of the film supporting surface 22. A gap 64d is formed between the pivots 64a and 64b, so that the pivots 64a and 64b can be snapped in the bearing holes 7a and 7d by resiliently inwardly deforming the upper aperture masking plate 64. When snapping the first pivot 64a into the bearing hole 7a, a pin 64h of the pivot 64a is engaged with a positioning member 7k formed near the bearing hole 7a, thereby to facilitate positioning of the upper aperture masking plate 64 inside the light-shielding box 7. A blocking wall 64e for blocking light entering through the gap 64d is formed along the film transporting direction between the gaps 64d and the rear edge 64c.

The pivot 64a has a slot 64f in which the coupling peg 62c of the crank lever 62 is engaged. Thereby, the upper aperture masking plate 64 is caused by the crank lever 62 to move pivotally between a standard position shown in FIG. 5A and a panoramic position shown in FIG. 5B, in cooperation with the slide plate 59 and the finder mask 43. The upper masking plate 64 is precisely positioned in the panoramic position, because a pair of lugs 64g formed on opposite horizontal sides of the plate 64 contact the stops 7g and 7h under the force of the toggle spring 63. In the standard position, the toggle spring 63 urges the upper masking plate 64 to contact the top wall of the light-shielding box 7. An arm 64i is integrally formed below the first pivot 64a, and a pin 64j is formed at a distal end of the arm 64i.

The pin 64j is engaged in a slot 65a formed in an arm 65b of the lower aperture masking plate 65. A pivot 65c is disposed at the junction of the arm 65b with a main plate portion 65d of the lower plate 65. Another pivot 65e is formed on the horizontal side of the lower plate 65 opposite the pivot 65c. A cut-off 65f is formed inside each of the pivots 65c and 65e so as to permit snapping the same into the respective bearing holes 7e and 7f. In this way, the lower plate 65 can pivot between the standard position and the panoramic position in cooperation with the upper plate 64. The lower plate 65 is precisely positioned in the panoramic position because a pair of lugs 65g formed on side edges of the main plate portion 65d contact the stops 7i and 7j under the force of the toggle spring 63. In the standard position, the toggle spring 63 urges the lower masking plate 65 to contact the bottom wall of the light-shielding box 7.

The main plate portion 65d of the lower aperture masking plate 65 is curved correspondingly to the bottom wall of the box 7 and has a flange 65h which extends along a rear edge perpendicularly upwardly from the main plate portion 65d. Because of the curvature of the main plate portion 65d, the inner surface of the lower plate 65 can be displaced farther from the optical path of the exposure light, and reflection of the exposure light on the inside surface is reduced, and hence the occurrence of flares is prevented. Also the flange 65h is curved correspondingly to the film supporting surface 22 so as to form a substantially rectangular panoramic picture frame on the photographic film 21a. Blocking walls 65i are formed to cover the cut-outs 65f for blocking light entering through the cut-outs 65f. It is to be noted that the exposure mechanisms 6 are omitted from FIG. 4, for clarity.

When the knob 46 is set in the standard position, the panoramic window 45 of the finder mask 43 is retracted from the optical path of the viewfinder 12, so that the full size field of view defined by the objective window 29 can be seen through the eyepiece window 30. Upon depression of the shutter button 41, the exposure mechanism 6 is activated to expose the film 21a to the exposure light within the exposure aperture 18. Because the upper and lower aperture masking plates 64 and 65 are retracted from the path of the exposure light in the standard position shown in FIGS. 5A and 6A, the whole portion of the film 21a bounded by the exposure aperture 18 is exposed. Thereby, a full size picture frame is recorded on the film 21a.

For panoramic photography, the knob 46 is slid along the slot 48 of the cover panel 44 in the direction shown by an arrow A in FIG. 4, thereby moving the finder mask 43 in this direction A until the notch 50 is caught on the click 52. By virtue of the toggle spring 63, the knob 46 can be slid more smoothly during the last half of this sliding movement. The photographer is informed by the click that the film unit is switched to the panoramic position. Simultaneously, the panoramic window 45 is placed in front of the objective window 29 coaxially with the finder optical axis 28.

The movement of the finder mask 43 in the direction A causes the switching lever 58 to rotate about the axle 27a in the direction shown by an arrow B in FIG. 4, and the slide plate 59 slides in the direction shown by an arrow C in cooperation with that rotation of the switching lever 58. Thereby, the crank lever 62 is rotated in the direction shown by an arrow D, placing the upper and lower aperture masking plates 64 and 65 in the panoramic position shown in FIGS. 5B and 6B. Because the field of view is defined by the panoramic window 45 at that time, the photographer can frame the photographic field in the panoramic size.

When the shutter button 41 is depressed in this position, the upper and lower aperture masking plates 64 and 65 cut off upper and lower parts of the light entering through the taking lens 5, so that only the remaining part of the light exposes the film 21a. As a result, a panoramic size picture frame is recorded on the film 21a. Since the upper and lower aperture masking plates 64 and 65 have edges 64c and 65h which are curved correspondingly to the film supporting surface 22 in the panoramic position, the horizontal, that is, the top and bottom margins of the panoramic size picture frame are straight and parallel to each other. Furthermore, because the pivotal axes of the masking plates 64 and 65 are disposed farther away from the photographic film 21a than the edges 64c and 65h, the edges 64c and 65h can be disposed as close as possible to the photographic film 21a, that is, not more than 2 mm, preferably about 1 mm from the film surface. Thereby, diffraction of exposure light is minimized, and hence the panoramic size picture frames have sharp horizontal margins.

Photographing continues thereafter by setting the knob 46 to either the standard photograph position or the panoramic photography position. After all frames have been photographed, the film unit containing the exposed photographic film is forwarded to a photofinishing laboratory. At the laboratory, the photographic film cassette 21 is removed from the film unit. If a depiction is printed on the cassette housing 21b indicating that the photographic film 21a includes both full size frames and panoramic size frames, this cassette housing can be easily grouped with others that similarly require special attention.

After this grouping, the photographic film 21a is pulled out of the cassette housing 21b, and is developed and inspected. At the time of this film inspection, a mark is added to each panoramic size frame in order to discriminate between full size and panoramic size frames. Because the panoramic size picture frames are of predetermined rectangular shape, they are easy to detect. After the film inspection, only full size frames are first printed. Next, after changing the print magnification factor of the printing lens and the size of the film mask and paper mask, only panoramic size frames are printed. The magnification factor for the full size frame is about 3.5, and that for the panoramic size frame is about 7. After such a printing process, the user is given the developed photographic film and its photoprints. The empty film unit is not given to the user but is returned to the factory to recycle reusable components.

Figure 7:
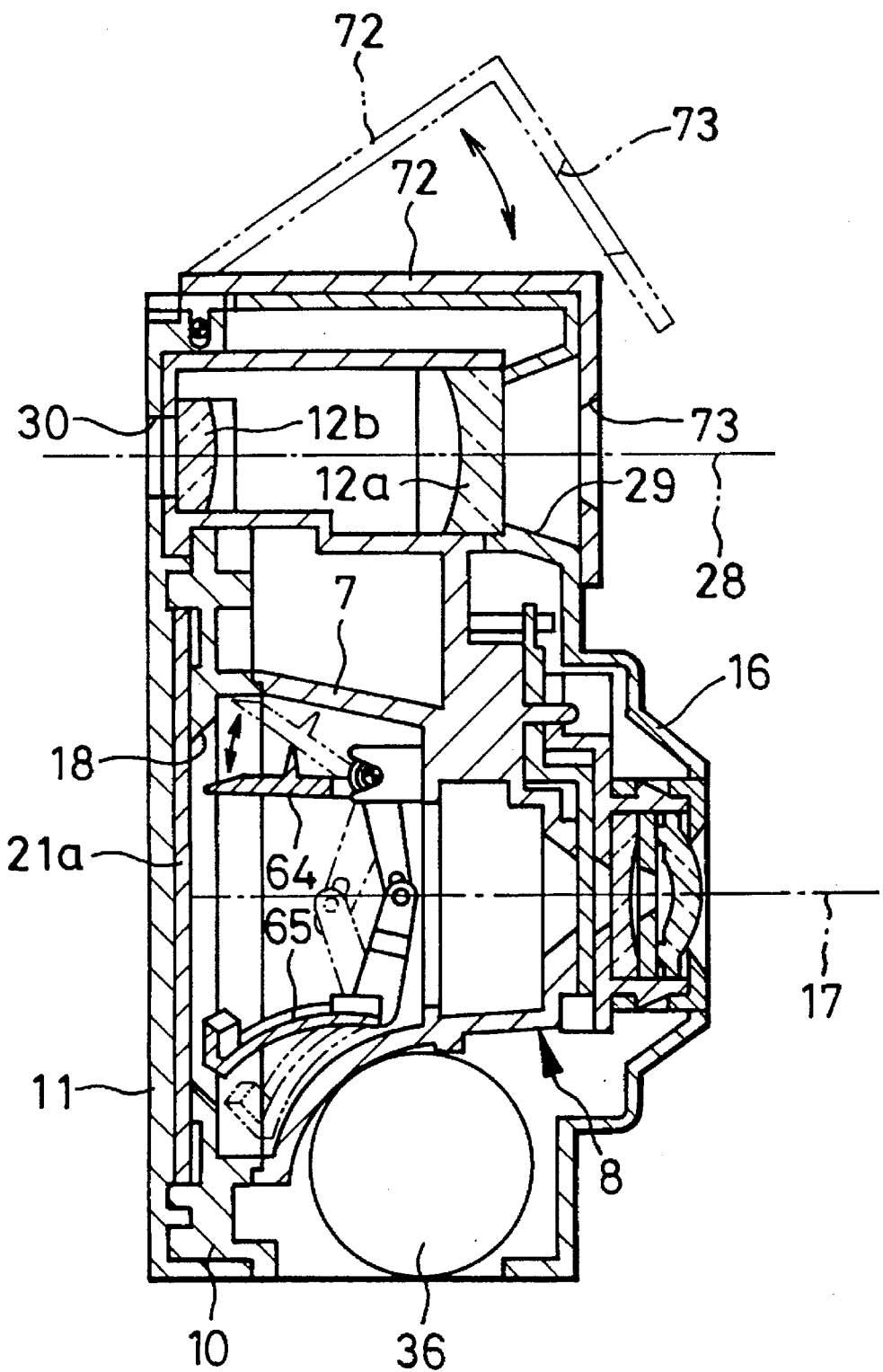
FIG. 7 is a vertical sectional view of a film unit having a pivotal viewfinder masking plate according to another embodiment of the invention.
Figure 8:
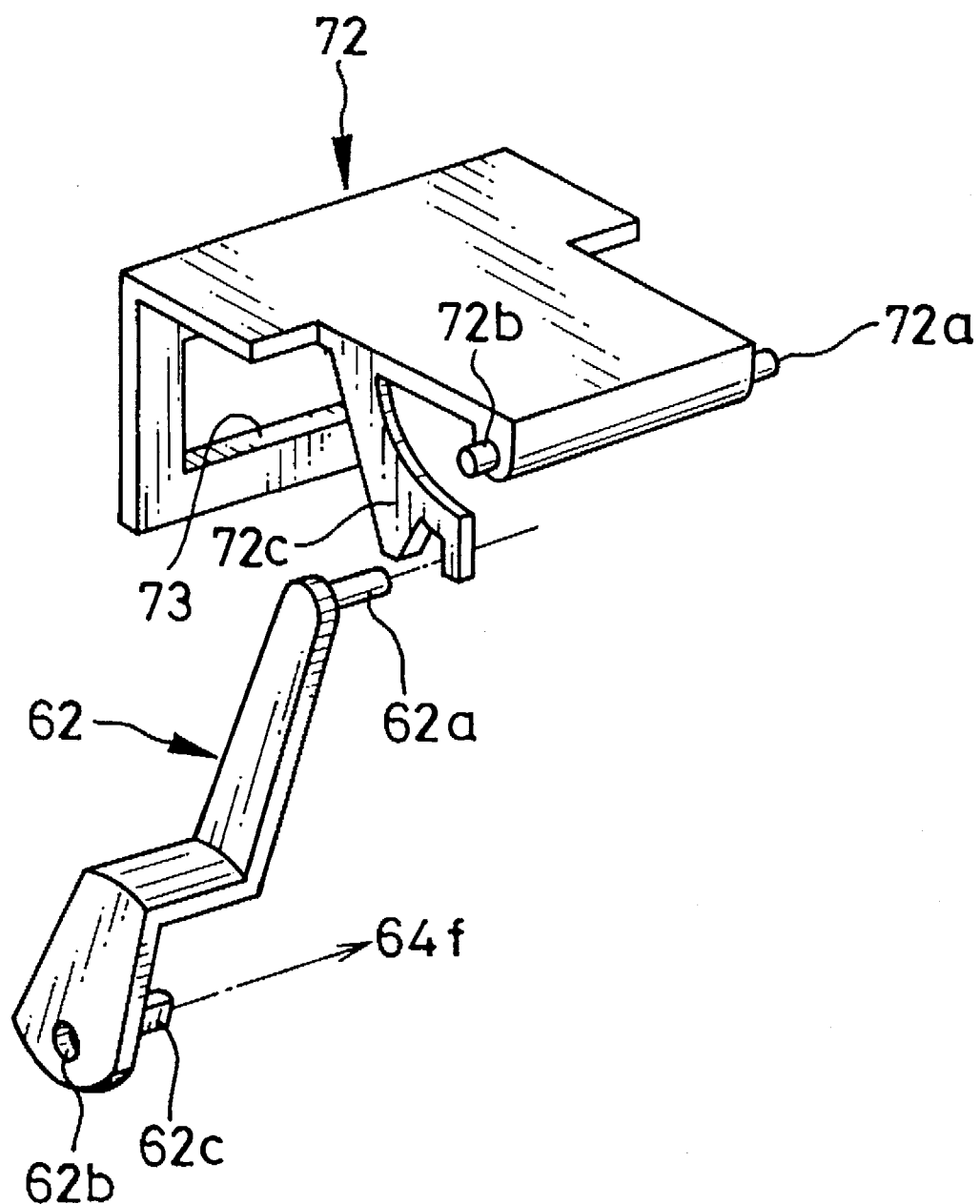
FIG. 8 is a perspective view of a portion of the embodiment of FIG. 7, illustrating the relationship between the pivotal viewfinder masking plate and the crank lever.

Although the finder mask 43 and thus the knob 46 are slidable between the standard and the panoramic positions in the above-described embodiment, it is possible to move the finder mask in other ways to change over the picture frame size upon changing the size of the field of view of the viewfinder 12, as is shown in FIGS. 7 and 8. In the embodiment shown in FIGS. 7 and 8, a finder mask 72 having a panoramic window 73 is formed as an L-shaped member having top and front walls which contact the top and front of the front cover 16, respectively, in the panoramic position, as is indicated by solid lines in FIG. 7. Pivots 72a and 72b are integrally formed on the rear end of the top wall of the L-shaped finder mask 72, which are hingedly received between the front and rear covers 16 and 11, so that the L-shaped finder mask 72 may pivot to a standard photography position wherein the panoramic window 73 is retracted from the field of view of the viewfinder 12, as is shown by phantom lines in FIG. 7. The panoramic window 73 formed in the front wall of the L-shaped finder mask 72 is placed coaxially with the finder optical axis 28 in the panoramic position.

A lever 72c is integrally formed with the L-shaped finder mask 72, so as to engage with an upper end 62a of a crank lever 62 and transmit pivotal movement of the L-shaped finder mask 72 to the crank lever 62 to move exposure aperture masking plates 64 and 65 correspondingly. Other constructions may be equivalent to those of the above-described embodiment. Therefore, a description thereof is omitted for brevity, while designating corresponding elements by the same reference numerals as above.

Figure 9:
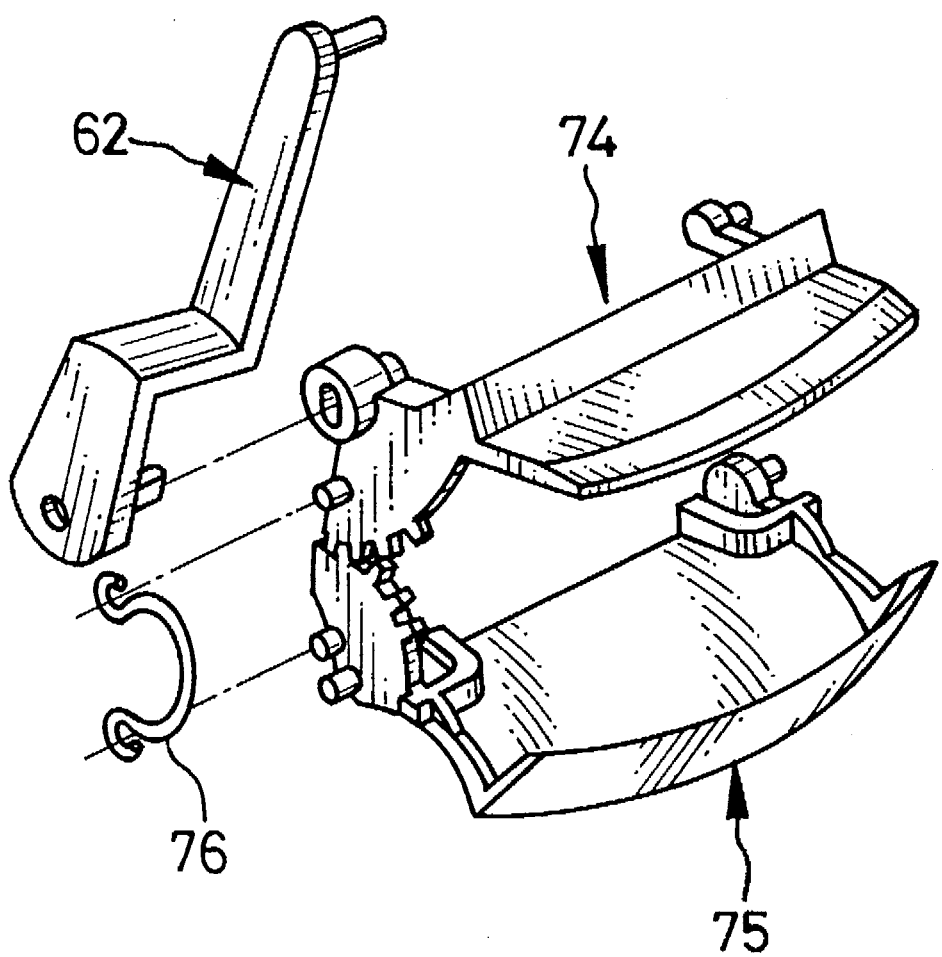
FIG. 9 is a perspective view of exposure aperture masking plates according to another embodiment of the invention.

FIG. 9 shows exposure aperture masking plates 74 and 75 according to another embodiment of the invention, which cooperate with each other through engagement between gears formed integrally with those masking plates 74 and 75. A toggle spring 76 urges the masking plates 74 and 75 toward one of the standard and the panoramic photography positions. The construction of the exposure aperture masking plates 74 and 75 is preferable for use with the pivoting L-shaped finder mask 72 shown in FIGS. 7 and 8.

Figure 6A:
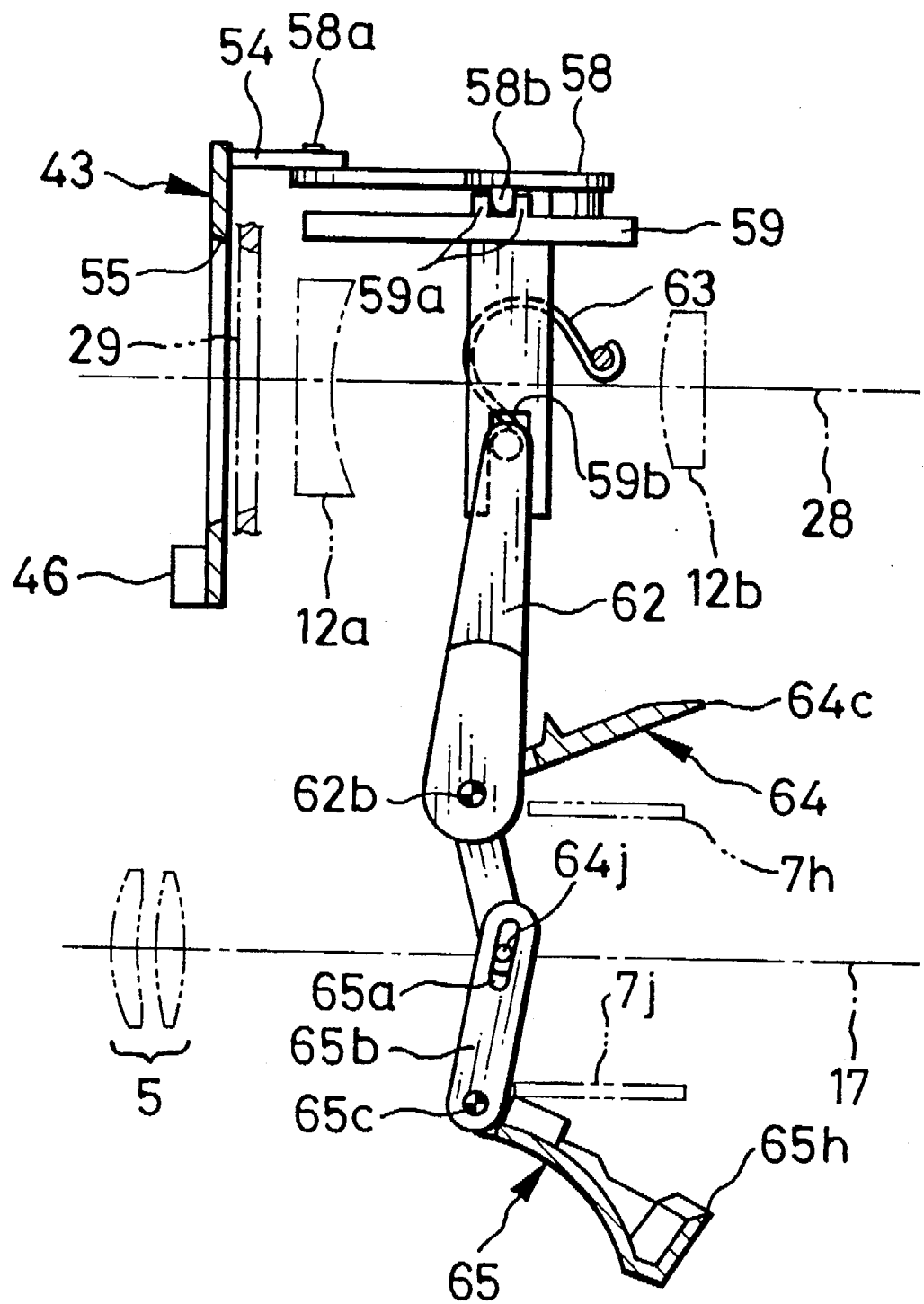
FIGS. 6A and 6B illustrate the operation of the exposure aperture size changing mechanism.
Figure 6B:
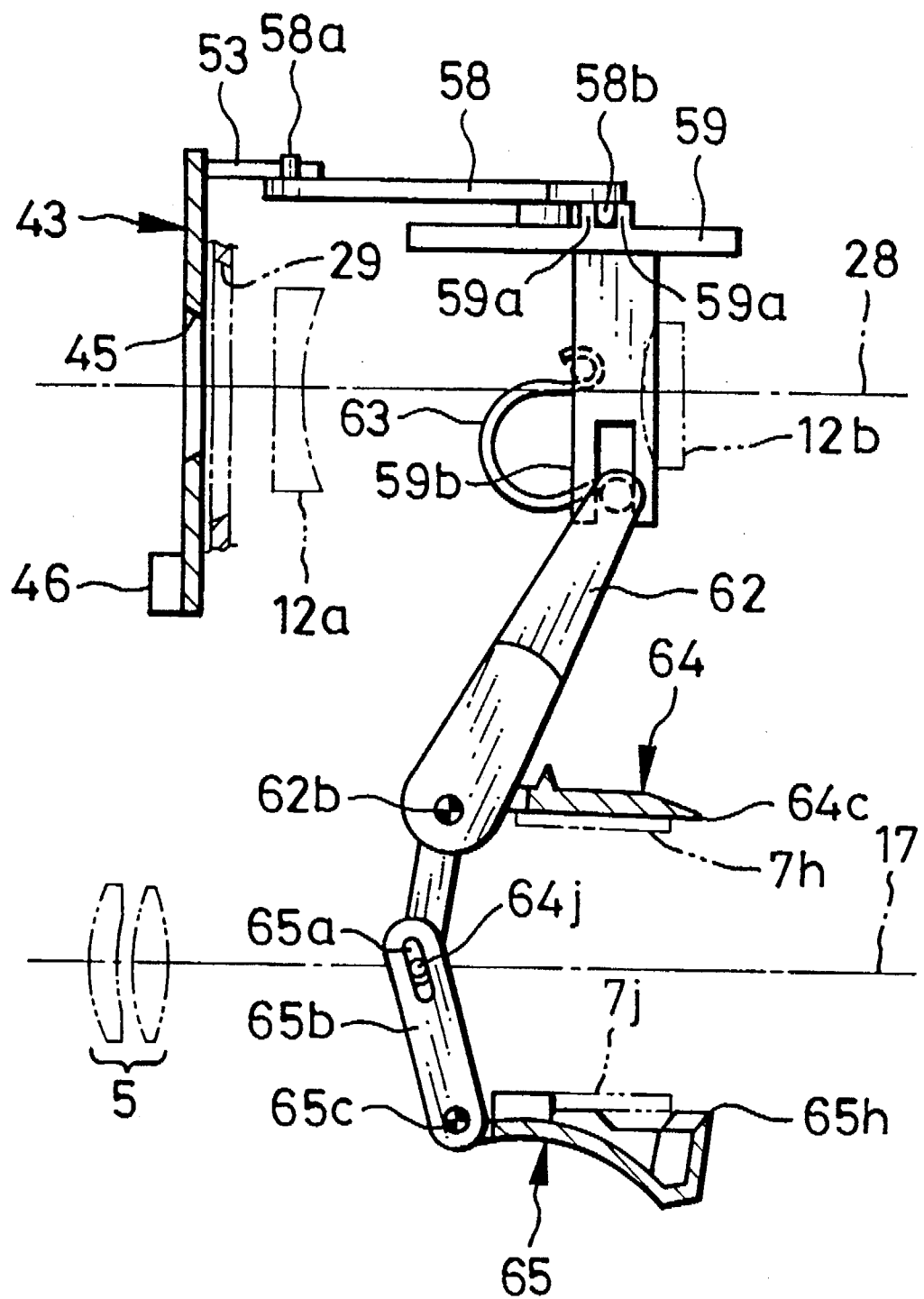

The exposure aperture masking plates 64 and 65 or 74 and 75 should be coupled to each other prior to their assembly into a film unit. This is because it is necessary to insert the pin 64j of the upper masking plate 64 into the slot 65a of the lower masking plate 65, or to hang the toggle spring 76 on the masking plates 74 and 75. Furthermore, the toggle spring 63 requires a large space for its movement, as is shown in FIGS. 6A and 6B. An embodiment shown in FIG. 10 solves these problems, wherein equivalent elements are designed by the same reference numerals as used in FIG. 4, so that the description of these equivalent elements can be omitted.

Figure 11A:
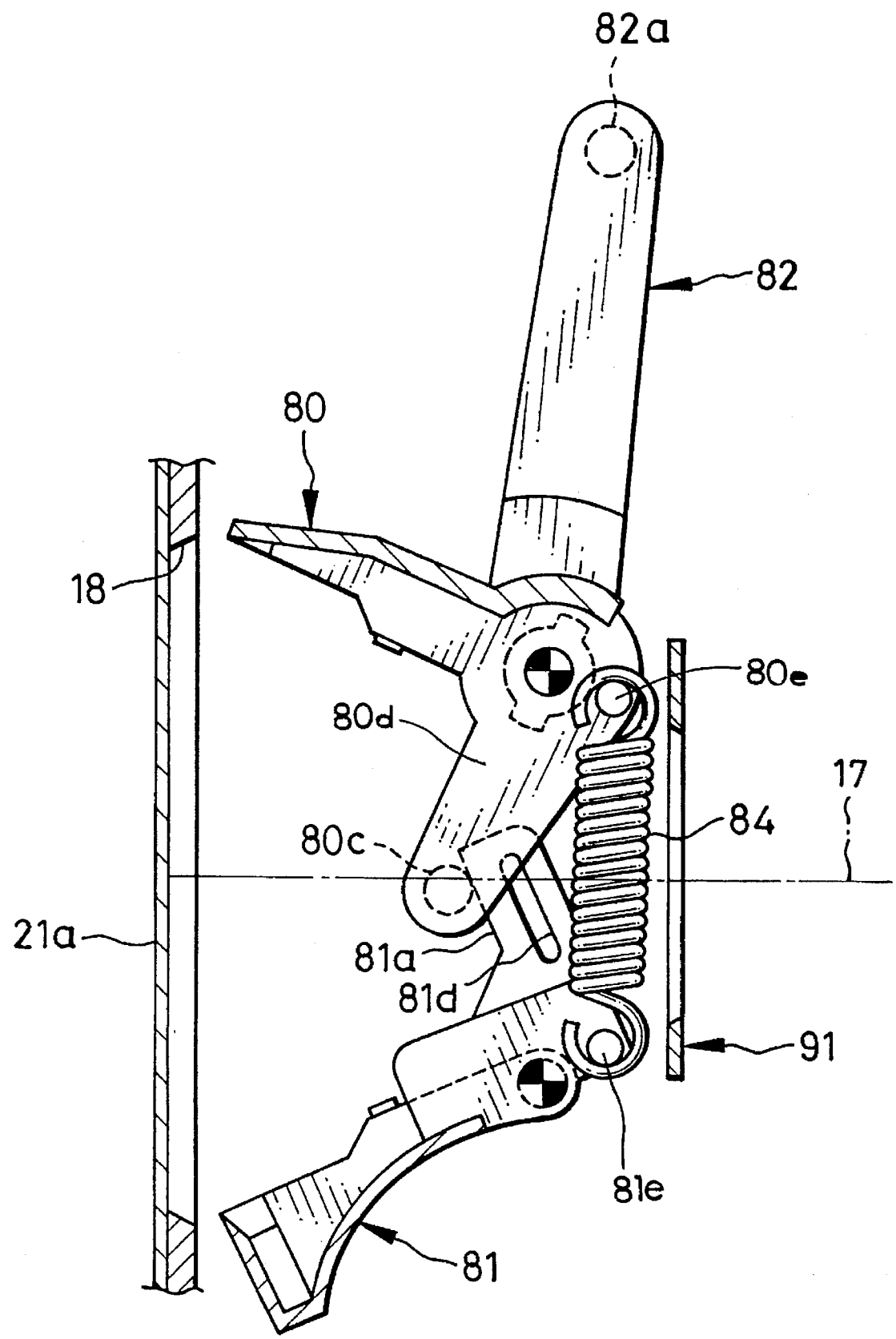
FIG. 11A is a diagram illustrating panoramic size photography with the embodiment shown in FIG. 10.

An upper masking plate 80 is mounted on a light-shielding box 7' through a pair of pivots 80a and 80b. The upper masking plate 80 has a pin 80c at a lower portion of an arm 80d extending downward from the picot 80a, as shown in detail in FIGS. 11A and 11B. A lower masking plate 81 has an arm 81a extending upward from one of a pair of pivots 81b and 81c which is to be disposed below the pivot 80a of the upper masking plate 80. The pivots 80a, 80b, 81b and 81c are snapped into bearing holes 7a, 7d, 7e and 7f of the light-shielding box 7' in the same way as in the above-described embodiment. A bearing portion 82b of a crank lever 82 is fitted over the pivot 80a through the bearing hole 7a of the box 7'. The pivot 80a and the bearing portion 82b are secured to each other by a force fit pin 83 coaxially fitted through these elements. When the crank lever 82 is rotated to the panoramic position as shown by an arrow in FIG. 11B, the pin 80c pushes a rear side of the arm 81a to transmit the rotational movement of the crank lever 82 and thus the rotational movement of the upper masking plate 80 to the lower masking plate 81. A slot 81d is formed through the arm 81a of the lower masking plate 81 so as to receive pressure transmitted from the pin 80c to the arm 81a.

According to this embodiment, the pin 80c is positioned properly on the rear side of the arm 81a merely by mounting the upper masking plate 80 from the rear side of the light-shielding box 7' after mounting the lower masking plate 81 also from the rear side into the light-shielding box 7'. A coil spring 84 is suspended between the upper and lower masking plates 80 and 81 to urge the masking plates 80 and 81 to swing away from each other, toward the standard photography position. The spring 84 also urges the arm 81a toward the pin 80c. Pins 80e and 81e for suspending the spring 84 are respectively formed in the vicinity of the pivots 80a and 81b of the upper and lower masking plates 80 and 81. The pins 80e and 81e protrude inwardly in the light-shielding box 7' so that the spring 84 can be suspended after the masking plates 80 and 81 are mounted on the light-shielding box 7'.

If the arm 81a of the lower masking plate 81 is designed to resiliently accept the pressure from the pin 80c, looseness between the arm 81a and the pin 80c may be absorbed without using the spring 86. Other constructions of the upper and lower masking plates 80 and 81 may be equivalent to those of the upper and lower masking plates 64 and 65, respectively.

Figure 11B:
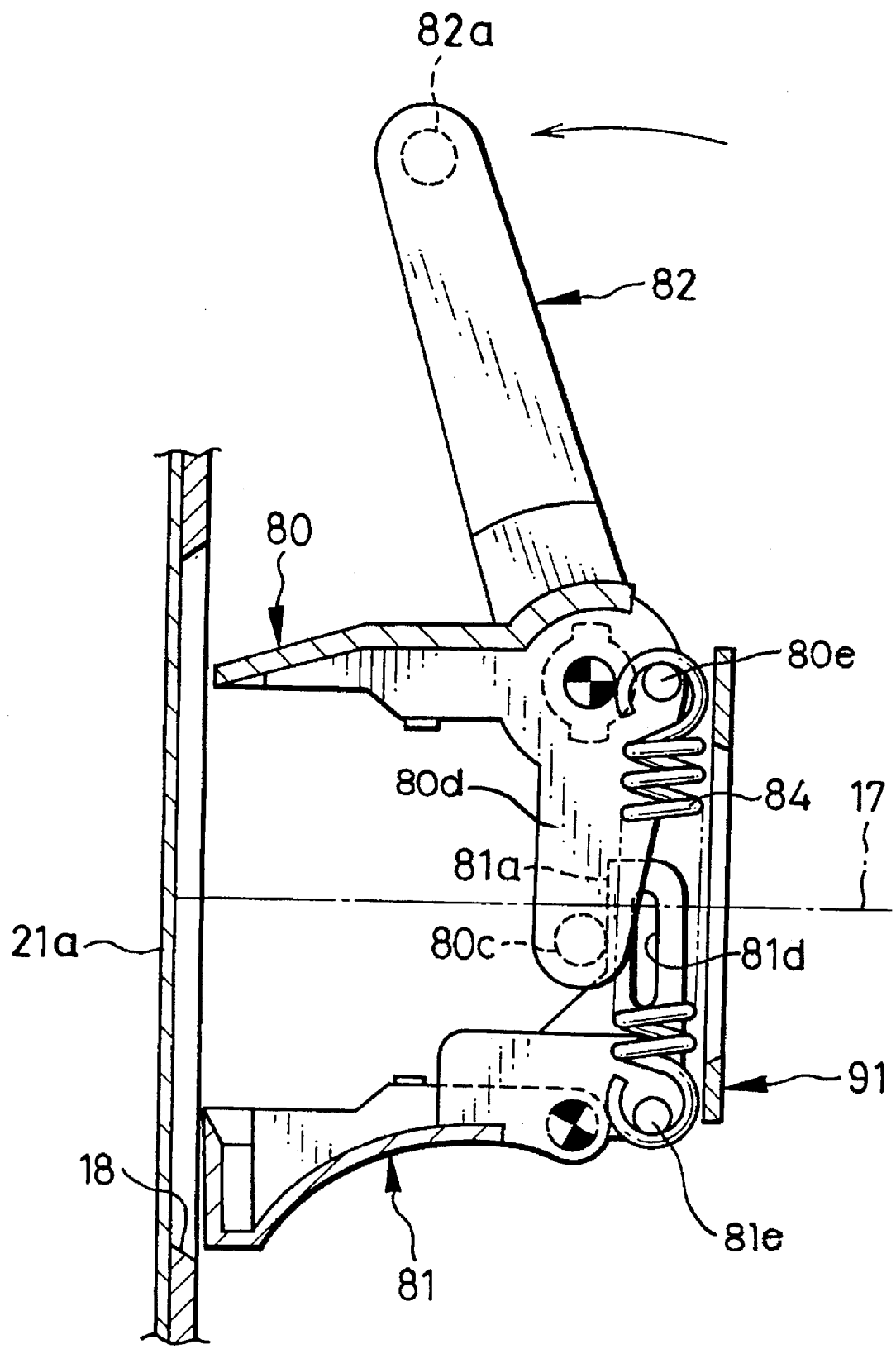
FIG. 11B is a diagram illustrating full-size photography with the embodiment of FIG. 10.

The crank lever 82 cooperates with a switching lever 85 such that a pin 82a formed on the upper end of the rank lever 82 is in the path of an arm 85a of the switching lever 85 and is pushed by the arm 85a in the direction shown by an arrow in FIG. 11b. A channel-shape finder lens frame 86 for accepting objective lens 12a and eyepiece 12b of an inverted Galilean viewfinder 12 from above is integrally formed on an upper portion of a mechanism base portion 13' which is formed integrally with the light-shielding box 7'. A finder lens holding plate 87 is removably mounted on the top of the finder lens frame 86 to hold the lenses 12a and 12b. An axle 87a for pivoting the switching lever 85 is formed integrally with the finder lens holding plate 87.

A finder mask 88 (see FIG. 10) corresponds to the finder mask 43 of the above-described embodiment, but has a cam projection 88a projecting rearward and contacting a projection 85b of the switching lever 85. The switching lever 85 and thus the finder mask 88 are urged by a spring 89 toward the standard photography position. The switching lever 85 is pivotally secured to the axle 87a by a force fit pin 90. According to this construction, when the finder mask 88 is slid from the standard photography position to the panoramic position, the switching lever 85 is swung against the force of the spring 89 to move the upper mask plate 80 from the standard photography position shown in FIG. 11A to the panoramic position shown in FIG. 11B through the crank lever 82, thereby moving the lower mask plate 81 from the standard photography position to the panoramic position. The finder mask 88 may be held in the panoramic position against the force of the springs 84 and 89 because a notch 50 of the finder mask 88 receives a click 52 (see FIG. 16) in the panoramic position.

If the finder mask 88 is not sufficiently moved to the panoramic position, the finder mask 88 and the exposure aperture masking plates 80 and 81 are returned to the standard photography position under the force of the springs 84 and 89. Even if the exposure aperture size changing mechanism is out of order, the exposure aperture size would be set to the full size which generally is used more frequently than the panoramic size. Therefore, the degree of inconvenience caused by such an accident is reduced. This embodiment does not need the space for the movement of the toggle spring 63, and the coiled spring 84 is easy to assemble compared with the toggle spring 63.

A light-shielding frame 91 for preventing flare effect in the standard photography is mounted on the light-shielding box 7' such that a pin 92 formed on a not-shown stepped portion of the light shielding box 7' guides the frame 91 to be positioned properly in the box 7' and thereafter the pin 92 is caulked.

Figure 10:
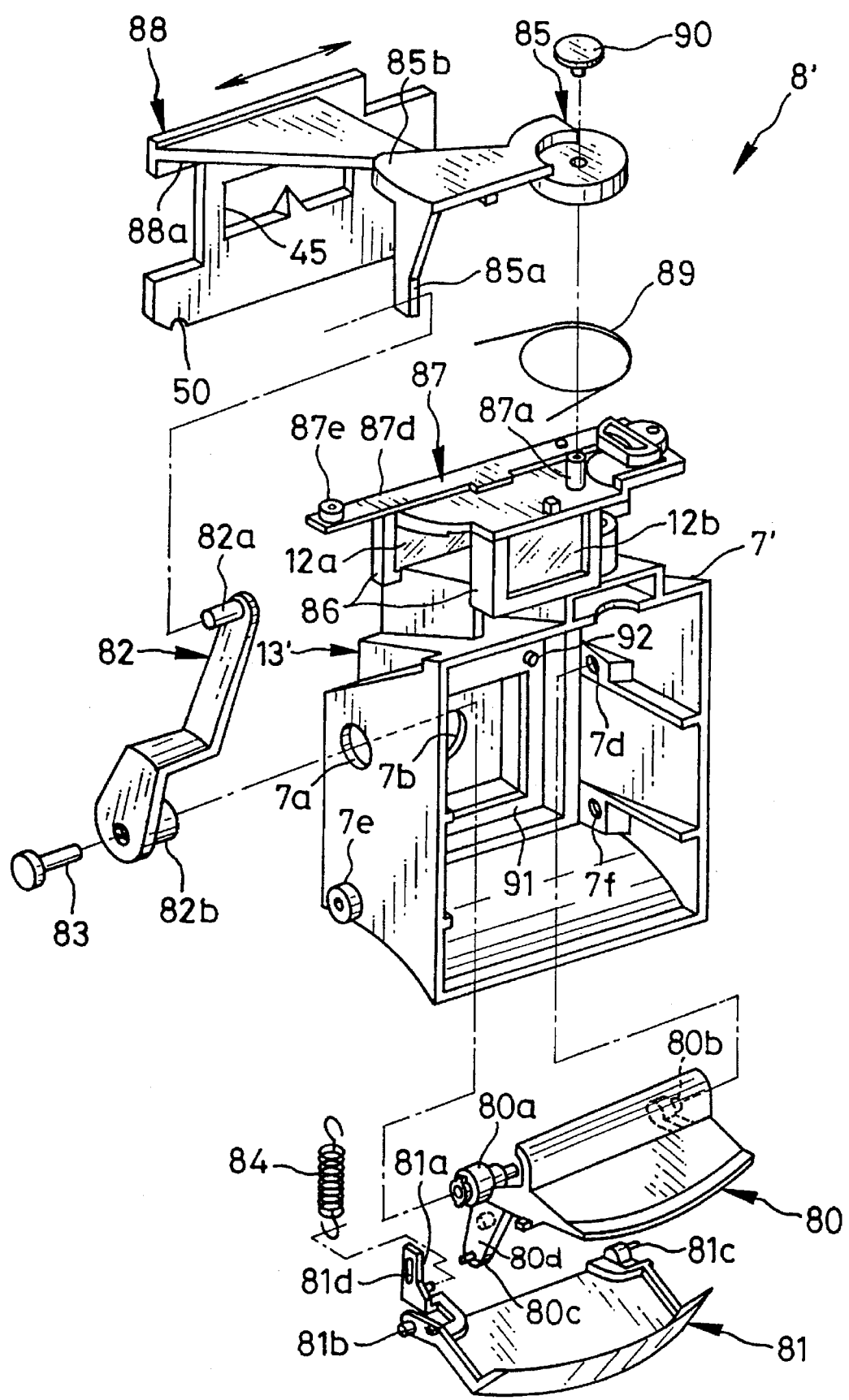
FIG. 10 is an exploded perspective view of an exposure aperture size changing mechanism of a film u n it according to another embodiment of the invention.
Figure 12:
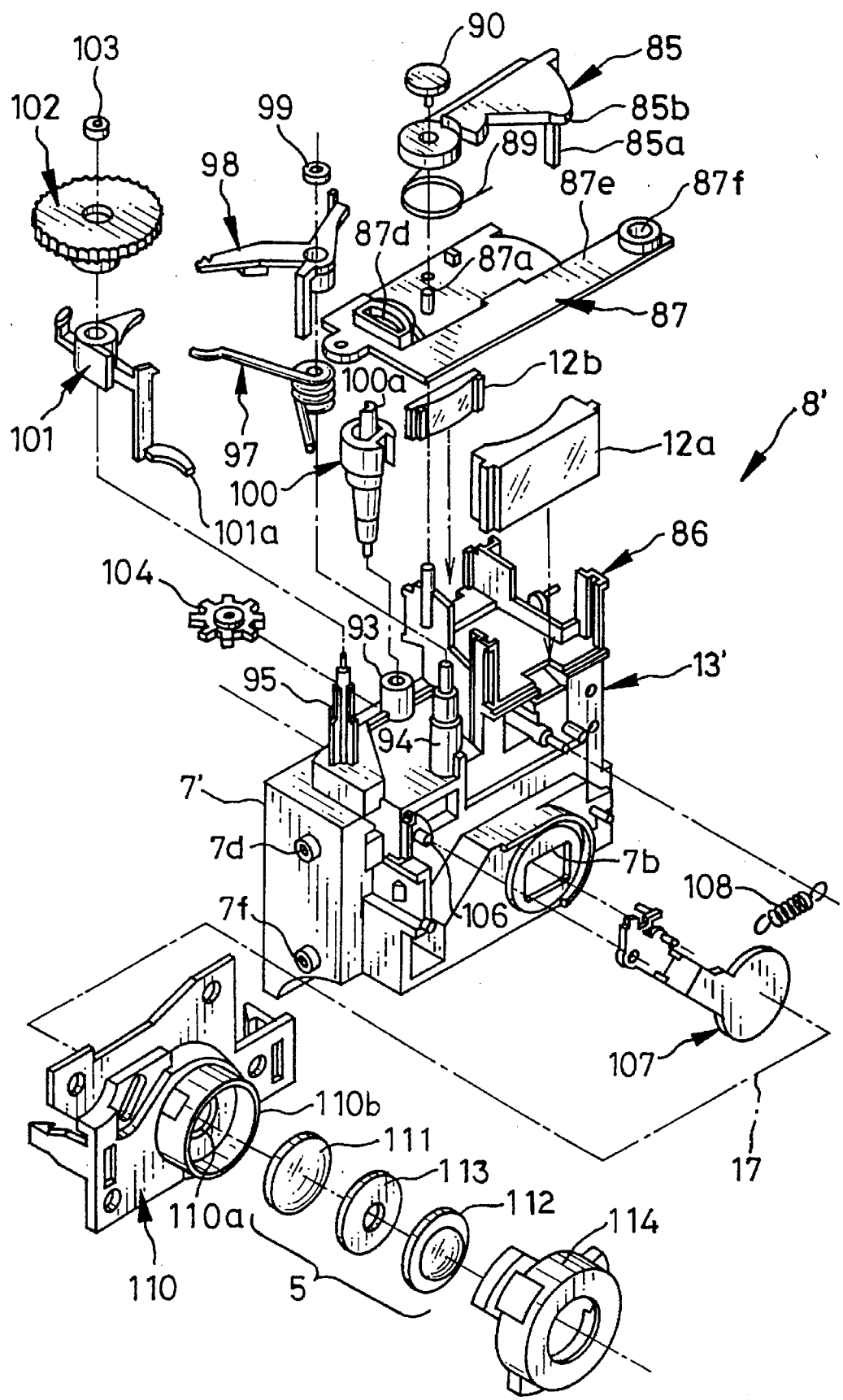
FIG. 12 is an exploded front perspective view of a photograph taking unit of the embodiment shown in FIG. 10, in which the exposure aperture size changing mechanism is incorporated.
Figure 13:
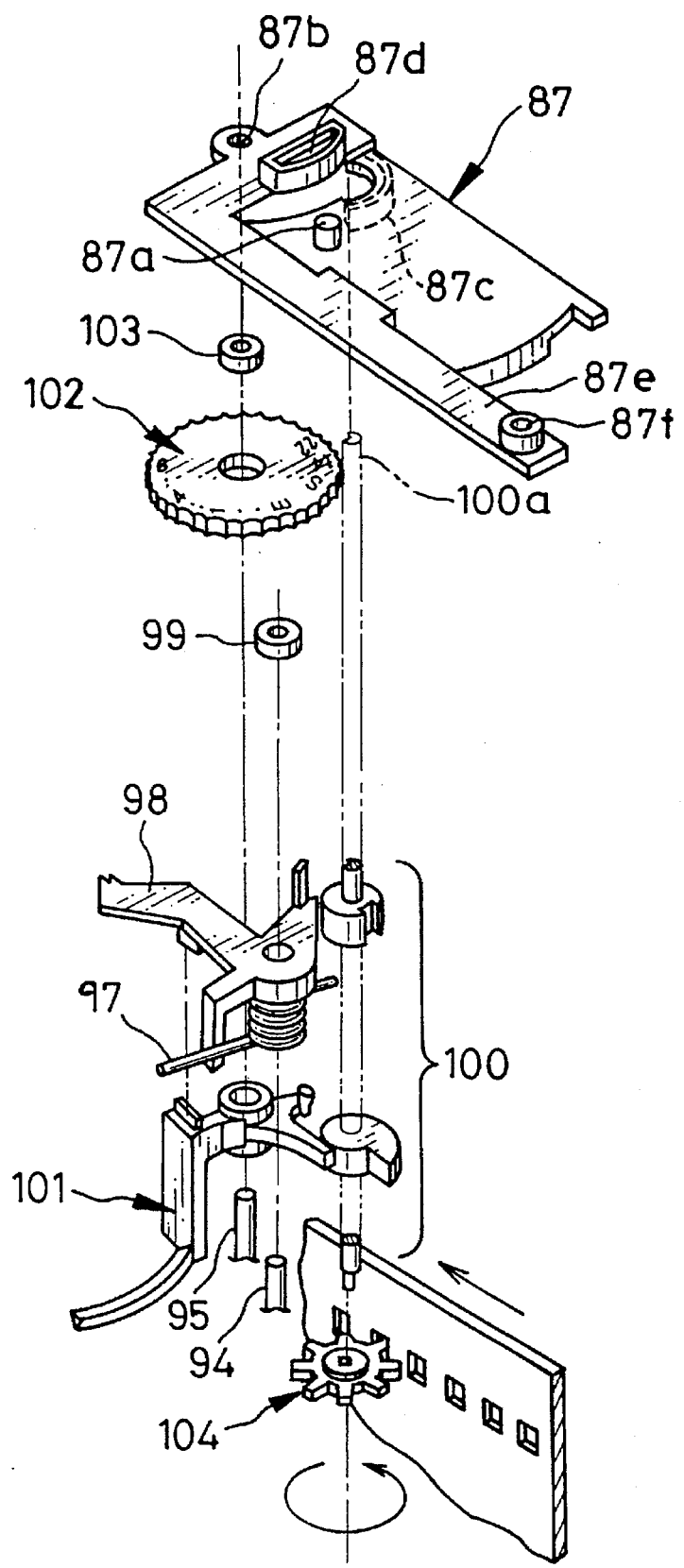
FIG. 13 is an exploded perspective view illustrating the relationship between the finder lens holding plate and the film advance stop mechanism and the shutter mechanism shown in FIG. 12.

FIG. 12 is a front perspective view of the photograph-taking unit 8' shown in FIG. 10. On the top of the base portion 13', a bearing sleeve 93 and two axles 94 and 95 are integrally formed therewith. A coiled spring 97 and an arresting lever 98 are rotatably fitted on the axle 94, and a snap ring 99 secures the spring 97 and the arresting lever 98 to the axle 94. A cam 100 is inserted in the bearing sleeve 93. A shutter actuating lever 101 and a frame counter disk 102 are rotatably fitted on the axle 95, and a snap ring 103 retains them on the axle 95. A one-tooth gear 100a is integrally formed on an upper portion of the cam 100, to mesh with teeth 102a formed around the periphery of the frame counter disk 102. As shown in FIG. 13, the cam 100 is engaged with the arresting lever 98 and the shutter actuating lever 101, and is coupled at its lower end with a sprocket wheel 104.

Upon rotating the film advancing wheel 24, the spool 21c of the film cassette 21 is rotated to advance the photographic film 21a. Because teeth of the sprocket wheel 104 are engaged in perforations of the photographic film 21a, the sprocket wheel 104 is rotated by the advance of the photographic film 21a, thereby rotating the cam 100. As a result, the shutter actuating lever 101 is moved into a cocked position through the arresting lever 98. Upon one revolution of the sprocket wheel 104, that corresponds to a one-frame advance of the photographic film 21a, an end of the arresting lever 98 is brought into engagement with one of the grooves formed around the periphery of the film advancing wheel 24, to prevent further rotation of the film advancing wheel 24. Also a frame counter disk 102 is rotated to advance the markings thereof by one.

Upon depression of the shutter button 41, the shutter actuating lever 101 starts swinging counterclockwise under the force of the spring 97. When the shutter actuating lever 101 has swung through a predetermined angle, a distal end 101a of the shutter actuating lever 101 strikes a shutter blade 107. The shutter blade 107 having a crank shape is pivotally mounted on an axle 106 formed on the front of the mechanism base portion 13' for swinging movement about an axis parallel to the optical axis 17 of a taking lens 5. The shutter blade 107 is urged by a spring 108 to a closed position to close the opening 7b formed coaxially with the optical axis 17 in the light-shielding box 7', and is swung to an open position to open the opening 7b when struck by the shutter actuating lever 101.

A shutter cover 110 is mounted in front of the shutter blade 107 to prevent the shutter blade 107 from fluttering in the direction of the optical axis 17. The shutter cover 110 has a stop aperture 110a, and a lens barrel 110b around the stop aperture 110a which are integrally formed as one body. After the taking lens 5 consisting of rear and front lens elements 111 and 112 and a spacer 113 inserted between these lens elements 111 and 112 is inserted in the lens barrel 110b, a lens cover 114 is fitted on the lens barrel 110b.

The photograph-taking unit 8' constructed as above may be removably attached to the front of the exposure aperture 18 of a film unit in the same way as the photograph-taking unit 8 shown in FIG. 1. Because other parts of the film unit may be equivalent to those shown in FIG. 1, illustrations of these parts are omitted. It is to be noted that the exposure mechanism shown in FIG. 12 has been disclosed in more detail, for example, in U.S. patent application Ser. No. 08/062,185, and is used in a film unit which has been marketed in Japan under the trademark "Fuji Color Utsurundesu Supr 800". Therefore, the possibility to reuse the parts of the film unit is increased, and the cost of the photograph-taking unit 8' is therefore less than conventional film units.

The rear lens 111 is preferably a biconvex spherical plastic lens, and the front lens 112 is preferably a convex meniscus plastic lens having an aspherical front surface. Although a conventional panoramic film unit produced by Fuji Photo Film Co., Ltd. has a taking lens whose focal length is designed to be 25 mm especially for a wide angle panoramic photographic field, the taking lens 5 of the film unit of the present invention is designed to have a focal length of 32 mm and an f-number of 10.5, because the film unit of the present invention is changeable between standard and panoramic size photography. Thereby, a wide angle effect is achieved in the panoramic size photography, while a standard view is provided in the standard size photography.

The reason why the taking lens 5 should have such a large f-number is to make the taking lens 5 pan-focus without the need for focusing. The focal length F of the taking lens for a film unit whose exposure aperture size is changeable between the panoramic size and the full size is preferably not less than 2 mm and not more than 33 mm. It is possible to constitute the taking lens of a single lens element, wherein the single lens element is an aspherical lens having aspherical opposite surfaces.

The finder lens holding plate 87 is made of a transparent plastic material, and has a hole 87b, an arched wall 87c, a convex lens portion 87d and a rib 87e integrally formed therewith. The hole 87b accepts the axle 95 and the arched wall 87c contacts a periphery of the cam 100 so as to rotatably support the cam 100. Thereby, the axle 95 and the cam 100 are maintained spaced a predetermined distance from each other. The convex lens portion 87d is disposed above one of a plurality of frame number markings provided on the top surface of the frame counter disk 102, so as to enlarge the marking to be seen through a frame number window 26 (see FIG. 16). The convex lens portion 87d is surrounded by an upwardly protruding frame which is also formed integrally with the finder lens holding plate 87. The frame is tightly fitted in the frame number window 26 to protect the interior of the film unit from dust or the like which may enter through the window 26.

Figure 14:
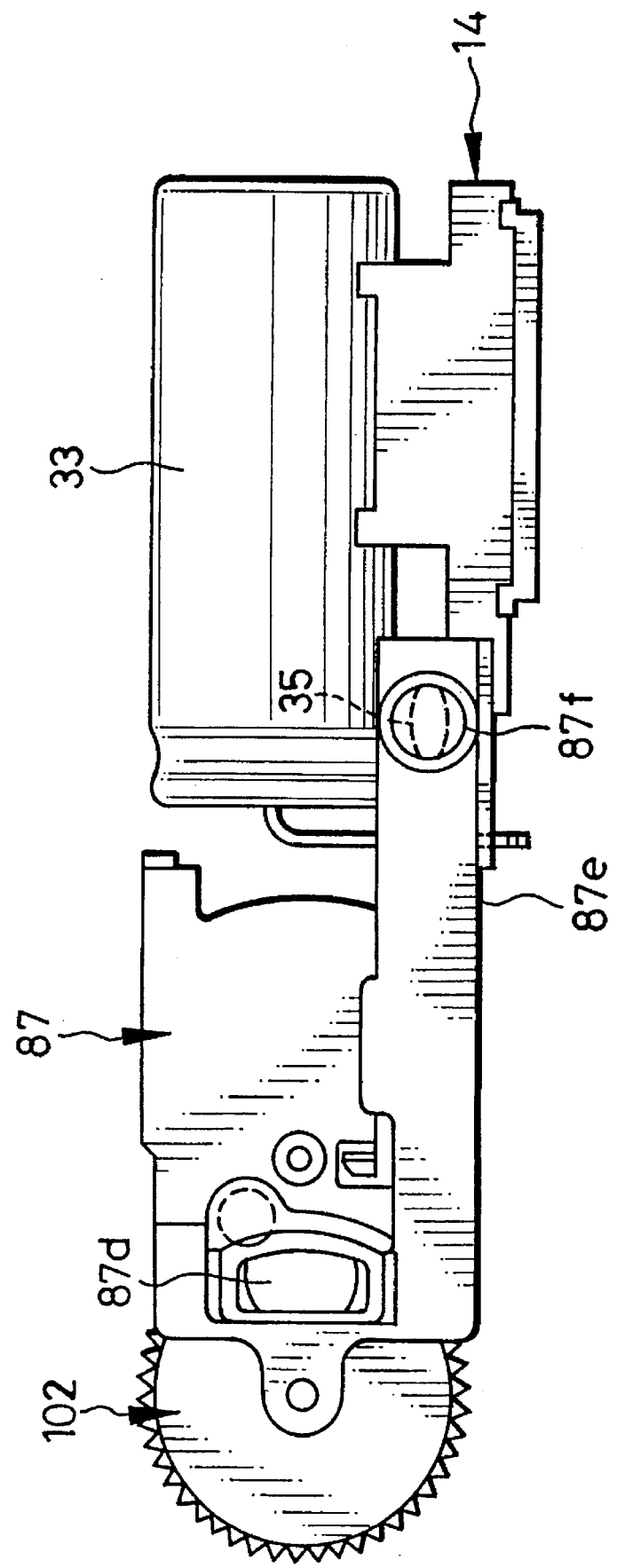
FIG. 14 is a schematic top plan view of the finder lens holding plate and the flash unit of the embodiment of FIG. 10.

The rib 87e extends over a charge lamp 35 of a flash unit 14, and a circular upward protrusion 87f is formed integrally on the rib 87e in a position just above the charge lamp 35 (see FIG. 14). The protrusion 87f is tightly fitted in a charge lamp window 39 (see FIG. 16), to protect the flash unit 14 from dust, water or the like which might otherwise enter through the charge lamp window 39, so as to prevent the short-circuiting of the flash unit 14.

Because the photograph-taking unit 8' is constructed as a unit which is removably attached to a main body section of the film unit without the danger of loss of any elements thereof, the unit 8' is easy to handle, and makes it possible to check the performance of the mechanisms and the lenses independently in each unit 8'. Because the photograph-taking unit 8' may be easily and reliably disassembled, most elements thereof are reusable.

Figure 15:
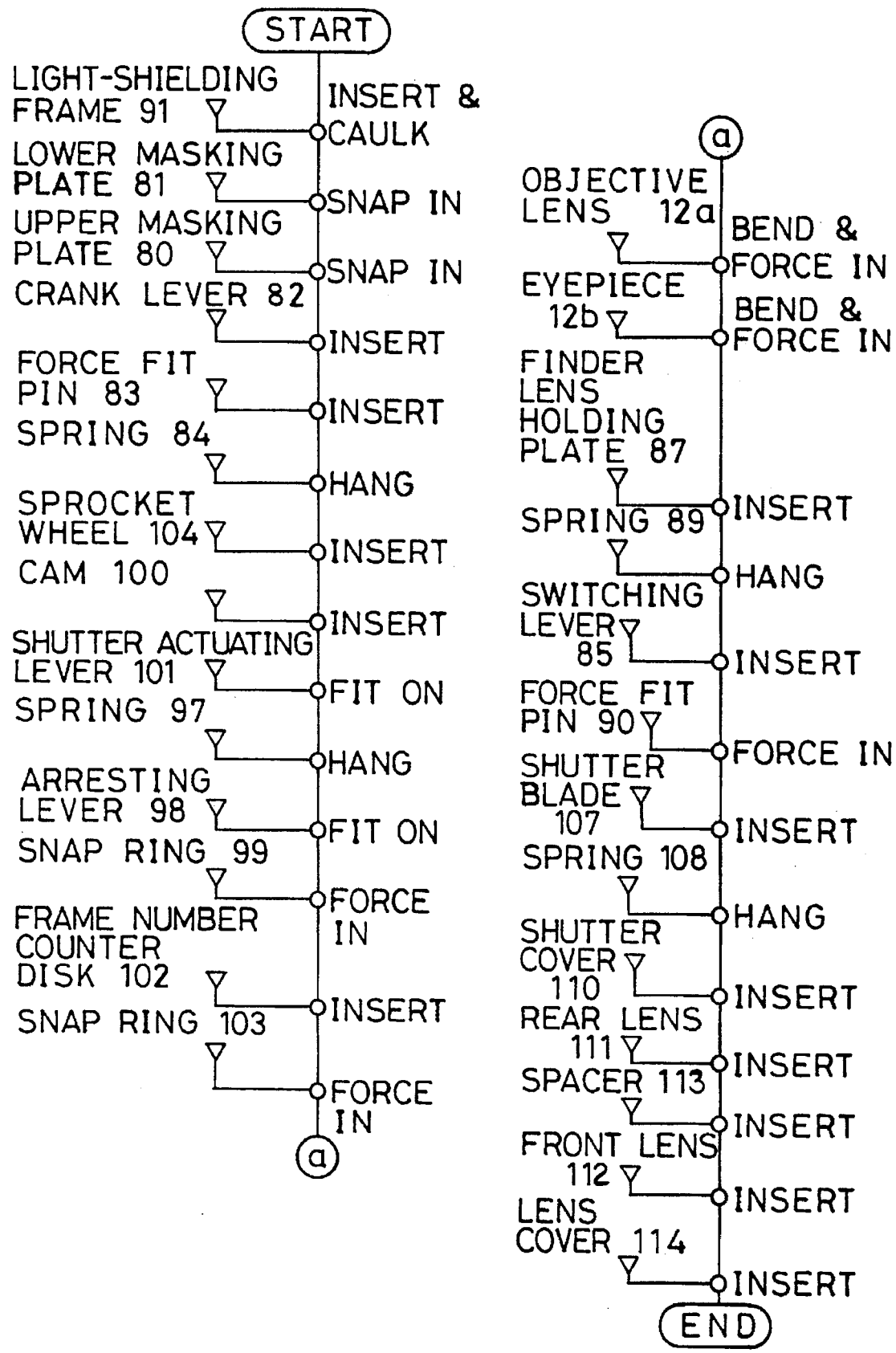
FIG. 15 is a flow chart illustrating a sequence of assemblage of the photograph-taking unit shown in FIGS. 10–14.

The sequence of assembling the film unit of the present invention will be described with reference to FIG. 15. The assembling operations can be completely automated. A mechanism base portion 13' of the photograph-taking unit 8' having the light-shielding box 7' as a unitary body is seriatim placed on each of a plurality of pallets which are successively conveyed on a conveyor. The pallets are transiently stopped at each assembling station along the path of the conveyor. Robots allocated to the respective stations handle predetermined elements to assemble them into the photograph-taking unit 8'. The elements are fed to each station in a properly aligned state by hoppers and aligning devices.

In the first station, the light-shielding frame 91 is inserted in the light-shielding box 7', and thereafter, the pin 92 is caulked. In the second station, the lower exposure aperture masking plate 81 is mounted in the box 7' by snap-in engagement while resiliently bending the pivots 81a and 81b of the masking plate 81. In the third station, the upper exposure aperture masking plate 80 is mounted in the box 7' by snap-in engagement of the pivots 80a and 80b in the same way as for the lower masking plate 81. In the fourth station, the crank lever 82 is mounted by fitting the bearing portion 82b into the bearing hole 7a of the box 7'. In the fifth station, the force fit pin 83 is fitted to couple the crank lever 82 and the upper masking plate 80. In the sixth station, the spring 84 is hung between the upper and lower masking plates 80 and 81. The assembling operations as described so far are carried out from the rear and right side of the mechanism base portion 13' with respect to its orientation in the film unit.

In the seventh station, the sprocket wheel 104 is mounted. In the eight station, the cam 100 is inserted in the bearing sleeve 93 to engage with the sprocket 104. In the ninth station, the shutter actuating lever 101 is rotatably fitted on the axle 95. In the tenth and eleventh stations, the spring 97 and the arresting lever 98 are rotatably fitted on the axle 94. In the twelfth station, the snap ring 99 is added. In the thirteenth station, the frame counter disk 102 is mounted on the axle 95, and the snap ring 103 is fitted thereon in the fourteen station. Since the exposure mechanism may be the same as those used in the known film unit as is described above, assembly stations for the exposure mechanism of the known film unit may be utilized as the seventh to fourteenth stations of the film unit of the present invention. This contributes to improving efficiency of assembly.

Next, the mechanism base portion 13' having been connected with the exposure mechanism is transported to the fifteenth station. The snap rings 99 and 103 prevent the arresting lever 98, the shutter actuating lever 101 and the frame counter disk 102 from dropping out during this transportation.

In the 15th and 16th stations, the objective lens 12a and the eyepiece 12b are respectively forced into the finder lens frame 86. In the 17th station, the finder lens holding plate 87 is mounted on the finder lens frame 86. In the 18th and 19th stations, the spring 89 and the switching lever 85 are respectively mounted on the axle 87a. In the 20th station, the force fit pin 90 is forced into the axle 87a. The assembling operations in the 7th to 20th stations are carried out from the rear and top side of the mechanism base portion 13'.

In the 21st and 22nd stations, the shutter blade 107 is mounted on the axle 106 and the spring 108 is hung thereon. In the 23rd station, the shutter cover 110 is attached. In the 24th, 25th and 26th stations, the rear lens 111, the spacer 113 and the front lens 112 are respectively inserted in the lens barrel 110b. Finally, the lens cover 114 is attached to the 27th station to complete the photograph-taking unit 8'. The assembling operations in the 21st to 27th stations are carried out from the front of the mechanism base portion 13'.

Figure 16:
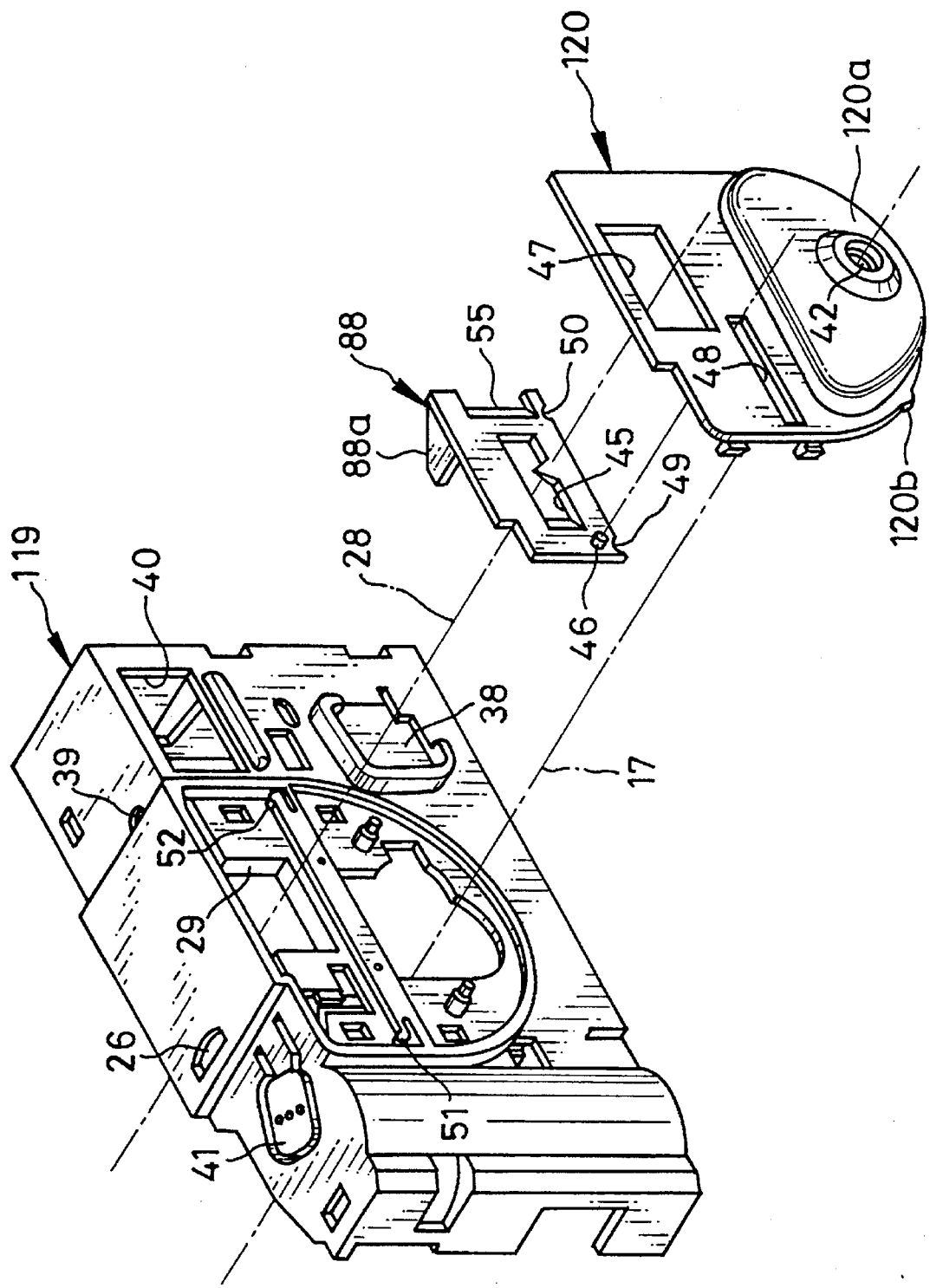
FIG. 16 illustrates an exploded perspective view of an embodiment of a front cover for use with the exposure aperture size changing mechanism shown in FIG. 10.

The photograph-taking unit 8' is transported to an assembling line of the film unit, along which the photograph-taking unit 8', the flash unit 14 and other elements are mounted on a main body section 10, in the same way as described with reference to FIG. 1. Thereafter, a front cover such as shown in FIG. 16 is attached to the main body section to cover these units. Then, a photographic film cassette is loaded into the main body section, which is then closed light-tightly by a rear cover 11 in a darkroom. The rear cover 11 is secured to the main body section 10 by ultrasonic welding. To avoid welding the upper or lower exposure aperture masking plate 80 or 81 onto the light-shielding box 7', which might be caused by ultrasonic waves for the welding of the rear cover 11, the masking plates 80 and 81 are made from silicone mixed with polystyrene, while the light-shielding box 7' is simply made from polystyrene.

It is to be noted also that the flash unit 14 and the rear cover 11 may be conventional. In this way, the assembly of the film unit is still further improved as to efficiency and cost.

FIG. 16 shows a front cover for use with the photograph-taking unit 8', shown in FIG. 10, wherein the finder mask 88 having the cam projection 88a is slidably held between a front cover basic body 119 and a front panel 120. The front panel 120 has a lens hood portion 120a beside an opening 47 for a finder objective window 29 and a slot 48 for sliding a knob 46 of the finder mask 88. An opening 42 for exposing the taking lens 5 is formed through the lens hood portion 120a. The lens hood portion 120a has a semi-circular bottom edge having a small semi-circular protrusion protruding radially from the lens hood portion 120a.

Figure 17:
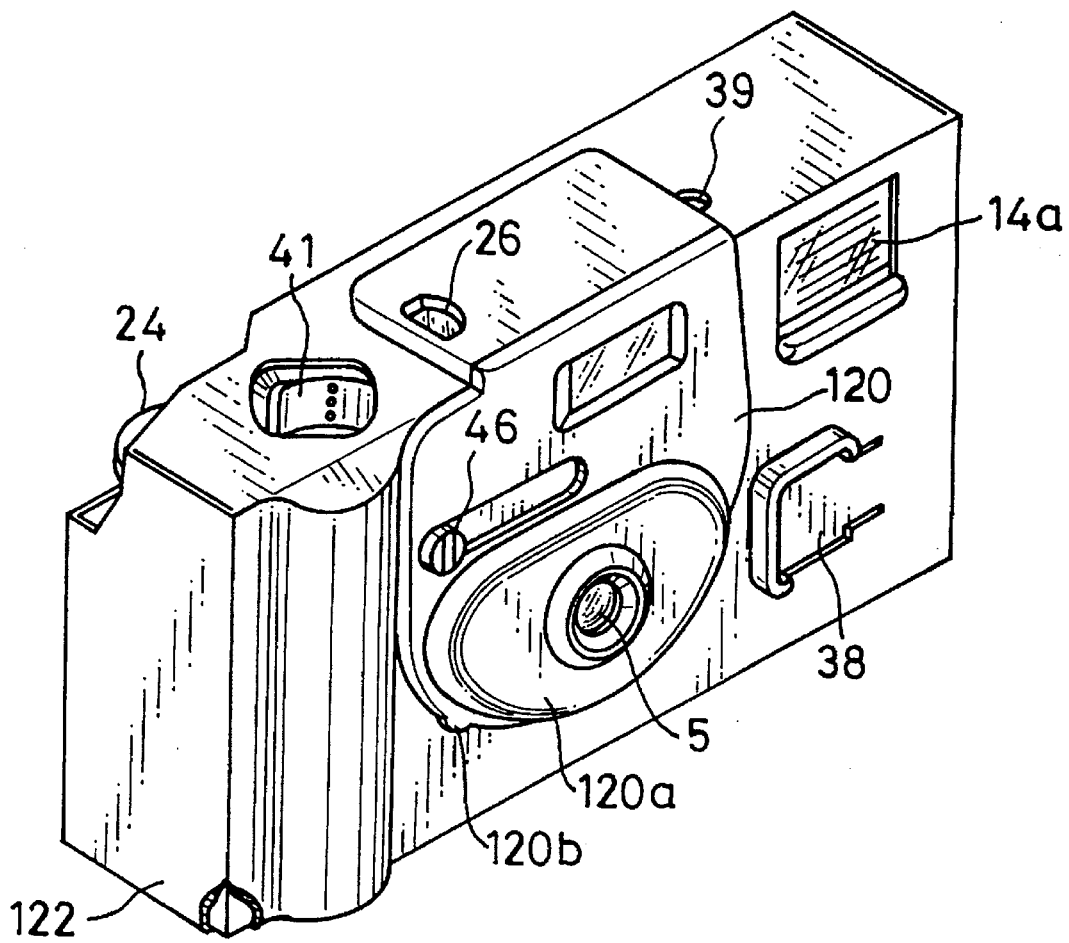
FIG. 17 is a perspective view of the film unit according to the embodiment shown in FIGS. 10–16.

After the front cover shown in FIG. 16 is assembled into a film unit with the photograph-taking unit 8', the film is encased in an outer case 122 having cut-outs for exposing the front panel 120, a shutter button 41, a film advancing wheel 24, a light emitting portion 14a of the flash unit 14, and so forth, as shown in FIG. 17.

Figure 18:
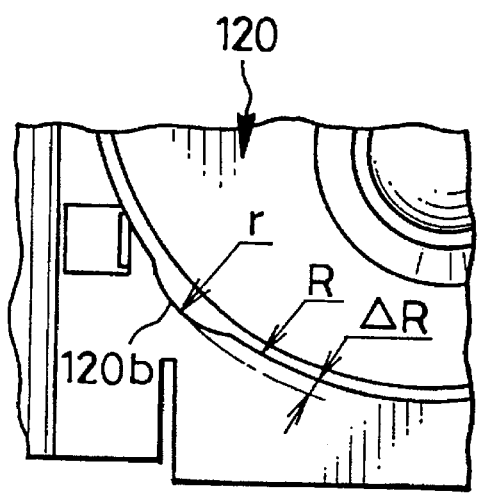
FIG. 18 is an enlarged fragmentary view of the front cover shown in FIG. 16.

The lens hood portion 120a is shaped in accordance with protrusions of the photograph-taking unit 8' to make the film unit as slender as possible. Forth is reason, a small protrusion 120b is formed to provide space for the shutter blade 107 to allow a sufficient movement thereof, while minimizing the lens hood portion 120a and thus the cut-out of the outer case 122 for the front panel 120. The shape of the lens hood portion 120a and that of the protrusion 120b are preferably determined as follows:

$$r/R \leq 0.26$$

$$\Delta R/R \leq 0.04$$

wherein "R" is the radius of the semi-circular edge of the lens hood portion 120a with respect to the optical axis 17 of the taking lens 5, "r" is the radius of the protrusion 120b, $\Delta R$ is the amount of protrusion of the distal end of the protrusion 120b relative to the semicircular edge of the lens hood portion 120a, as indicated in FIG. 18.

Figure 19:
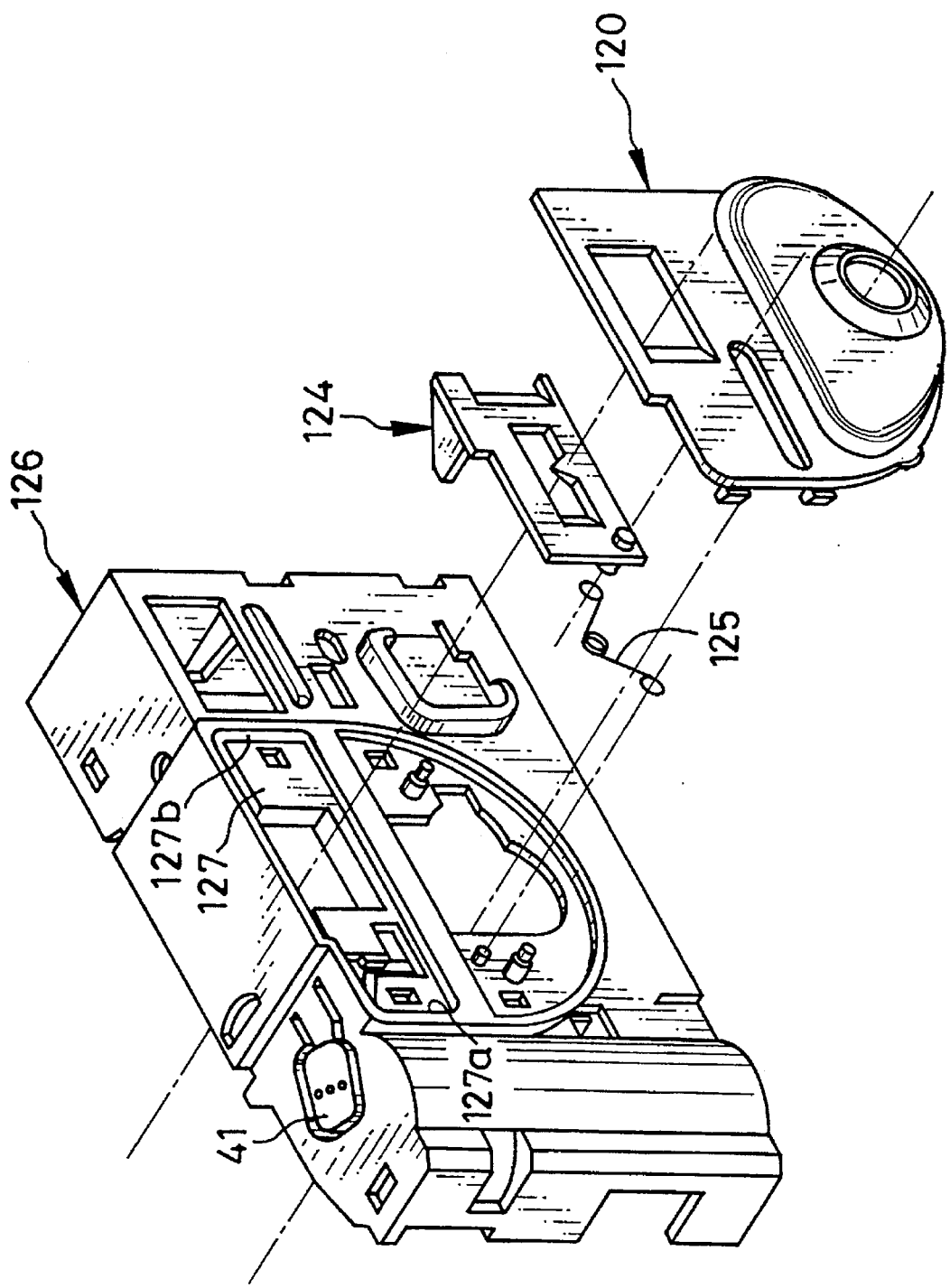
FIG. 19 is an exploded perspective view of a front cover having a viewfinder masking plate according to another embodiment of the invention, which is urged by a toggle spring.

Although the finder mask 43 or 88 is retained in either the panoramic or the standard photography position by click engagement in the above-described embodiment, it is possible to urge a slidable finder mask 124 to one of the two photographic positions by a toggle spring 125 which is suspended between the finder mask 124 and a front cover basic body 126, as is shown in FIG. 19. In this embodiment, it is preferable to position the finder mask 124 by contacting it against one of the side walls 127a and 127b of a sliding recess 127 of the front cover basic body 126.

FIGS. 20 and 21 show another embodiment of the invention, wherein a pair of exposure aperture masking plates 80 and 81 are mounted in a light-shielding box 130 which is integrally formed with a main body section 131 between a cassette chamber 132 and a film roll chamber 133. Therefore, bearing holes 130a are formed in the light-shielding box 130, for snapping pivots 80a, 80b, 81b and 81c of the masking plates 80 and 81 therein. Thereafter, a crank lever 82 and a photograph-taking unit 134 having no light-shielding box are attached to the light-shielding box 130. The photograph-taking unit 134 has an L-shaped mechanism base portion 134a which covers the front and top of the box 130 when attached thereto. By attaching a front cover such as shown in FIG. 16 to the main body section 131, a film unit changeable between panoramic and standard photography is provided.

Although the above-described embodiments of the invention all relate to exposure aperture size changeable film units whose exposure aperture size is changeable between panoramic size and full size, it is of course possible to make it changeable between a Hi-vision size (aspect ratio 1.46) and panoramic size, or between full size and Hi-vision size, or another combination of picture frame sizes.

Although the present invention has been described with reference to preferred embodiments shown in the drawings, the present invention is not limited by the embodiments but, on the contrary, various modifications of the present invention can be effected without departing from the scope and spirit of the appended claims.

What is claimed is:

1. In a lens-fitted photographic: film unit having a film supply chamber containing a roll of unexposed photographic film, a taking lens, an exposure aperture and an exposure mechanism for exposing said photo-graphic film, and a film take-up chamber disposed on the side of said exposure aperture opposite said film supply chamber., for winding up said photographic film after exposure, said lens-fitted photographic film unit comprising:

a pair of exposure aperture masking plates movable in front of said exposure aperture between a first position for defining a first size picture frame on said photographic film and a second position for defining a second size picture frame which is smaller than and is different in aspect ratio from said first size picture frame, said exposure aperture masking plates being movably mounted in a light-shielding box disposed between said exposure aperture and said taking lens;

a viewfinder having a first field of view which corresponds to said first size picture frame;

a finder mask member movable into said first field of view of said viewfinder to provide a second field of view which corresponds to said second size picture frame;

an operation member for manually moving said finder mask member to select one of said first and second fields of view;

interconnecting means cooperating with said finder mask member to set said exposure aperture masking plates in one of said first and second positions in correspondence with said selected field of view; and a mechanism base portion disposed on the front and top of said light-shielding box, for mounting said taking lens and said exposure mechanism;

the improvement wherein:

said finder mask member is insertable into and removable from a third position in front of an objective lens of said view finder and is slidable in horizontal rectilinear directions perpendicular to an optical axis of said viewfinder on a front cover of said film unit, said front cover covering the front and top of said film unit, said finder mask member surrounding said optical axis only when in said third position.

2. A lens-fitted photographic film unit as recited in claim 1, wherein said finder mask member is disposed in a clearance defined between said front cover and a front panel disposed in front of said front cover, and is slid in said clearance to change said fields of view of said viewfinder.

3. A lens-fitted photographic film unit as recited in claim 1, wherein said interconnecting means connects said operation member to one of said exposure masking plates, and said exposure aperture masking plates are interconnected for conjoint movement in opposite directions.

4. A lens-fitted photographic film unit as recited in claim 3, wherein said interconnecting means comprises a switching lever engaged with said finder mask member and moved by said operation member, and a crank lever transmitting the movement of said switching lever to said one exposure masking plate, said switching lever being rotatably mounted on said finder lens holding plate, said crank lever being mounted on an outside wall of said light-shielding box on the same side as said film supply chamber.

5. A lens-fitted photographic film unit as recited in claim 1, wherein said finder lens holding plate is made of transparent plastic material and has a convex lens portion formed integrally therewith and is disposed above a frame counter disk to enlarge a marking of said frame counter disk as seen through a frame number window formed in the top wall of said front cover.

6. A lens-fitted photographic film unit as recited in claim 5, wherein said finder lens holding plate has a frame surrounding said convex lens portion, said frame being fitted tightly in said frame number window to prevent the entry of dust through said frame number window.

7. A lens-fitted photographic film unit as recited in claim 1, further comprising a flash unit having a printed circuit board mounted between said light-shielding box and said film supply chamber and having a charge lamp for indicating the charge condition of said flash unit through a charge lamp window formed on the top wall of said front cover, wherein said interconnecting means is disposed behind said printed circuit board so as not to interfere with electric elements of said flash unit.

8. A lens-fitted photographic film unit as recited in claim 7, wherein said finder lens holding plate extends over said charge lamp to prevent the entry of dust or water through said charge lamp window.

9. A lens-fitted photographic film unit as recited in claim 1, wherein said front wall of said film unit comprises a basic portion covering the front and top of said film unit, and having an objective window of said viewfinder, and a recess formed around said objective window for slidably accepting said finder mask member, and a front panel removably attached to said basic portion to slidably hold said finder mask member, said front panel having a slot for exposing said operation member to the outside.

10. A lens-fitted photographic film unit as recited in claim 9, wherein said front panel includes a lens hood portion for covering the front of said exposure mechanism and having an opening for exposing said taking lens, said lens hood portion having a semicircular bottom edge from which a small semi-circular protrusion protrudes in a radial direction for providing a space for a shutter blade to be retracted from the optical path of said taking lens.

11. A picture frame size changing device for a camera, comprising:

a pair of exposure aperture masking plates movable in front of an exposure aperture of said camera between a first position for defining a first size picture frame and a second position for defining a second size picture frame which is smaller and is different in aspect ratio from said first size picture frame;

a finder mask member movable in front of an objective window of an inverted Galilean viewfinder of said camera having a first field of view which corresponds to said first size picture frame, to provide a second field of view which corresponds to said second size picture frame;

an interconnecting mechanism for actuating said exposure aperture masking plates conjointly with said finder mask member;

said finder mask member being slidable in a horizontal rectilinear direction in front of said objective window perpendicular to an optical axis of said viewfinder said finder mask member surrounding said optical axis in only one possible position of said finder mask member; and an operation means for manually sliding said finder mask member.

12. A picture frame size changing device as recited in claim 11, wherein said finder mask member is disposed in a clearance defined between a front cover of a said camera covering the front and top thereof and a front panel disposed in front of said front cover, and is slid in said clearance to change said fields of view of said view-finder.

13. In a lens-fitted photographic film unit having a film supply chamber containing a roll of unexposed photographic film, a taking lens, an exposure aperture and an exposure mechanism for exposing said photographic film, and a film take-up chamber disposed on the side of said exposure aperture opposite said film supply chamber, for winding up said photographic film after exposure, said lens-fitted photographic film unit comprising:

a pair of exposure aperture masking plates movable in front of said exposure aperture between a first position for defining a first size picture frame on said photographic film and a second position for defining a second size picture frame which is smaller than and is different in aspect ratio from said first size picture frame, said exposure aperture masking plates being movably mounted in a light-shielding box disposed between said exposure aperture and said taking lens;

a viewfinder having a first field of view which corresponds to said first size picture frame;

a finder mask member movable into said first field of view of said viewfinder to provide a second field of view which corresponds to said second size picture frame;

an operation member for manually moving said finder mask member to select one of said first and second fields view;

interconnecting means cooperating with said finder mask member to set said exposure aperture masking plates in one of said first and second positions in correspondence with said selected field of view; and a mechanism base portion disposed on the front and top of said light-shielding box, for mounting said taking lens and said exposure mechanism;

the improvement wherein:

said viewfinder has an objective lens and an eyepiece held by a finder lens holding plate;

said finder mask member is slidable in a horizontal rectilinear direction perpendicular to an optical axis of said viewfinder on a front cover of said film unit covering the front and top of said film unit, to be insertable into and removable from a third position in front of said objective lens of said viewfinder; and said viewfinder is in said first position defining said first size picture frame, until said finder mask member is inserted into said position in front of said objective lens of said viewfinder defining said second size picture frame, said finder mask member surrounding said optical axis only when in said third position.

* * * * *